(12) United States Patent
Chang et al.

(10) Patent No.: US 11,762,166 B2
(45) Date of Patent: Sep. 19, 2023

(54) PLASTIC LENS BARREL, IMAGING LENS MODULE AND ELECTRONIC DEVICE

(71) Applicant: LARGAN PRECISION CO., LTD., Taichung (TW)

(72) Inventors: Ming-Shun Chang, Taichung (TW); Ming-Ta Chou, Taichung (TW); Wei-Hung Weng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 55 days.

(21) Appl. No.: 17/563,225

(22) Filed: Dec. 28, 2021

(65) Prior Publication Data

US 2022/0120996 A1 Apr. 21, 2022

Related U.S. Application Data

(63) Continuation of application No. 16/655,485, filed on Oct. 17, 2019, now Pat. No. 11,249,275.

(30) Foreign Application Priority Data

Jan. 21, 2019 (TW) .................................. 108102307

(51) Int. Cl.
 *G02B 7/02* (2021.01)
(52) U.S. Cl.
 CPC ............. *G02B 7/021* (2013.01); *G02B 7/025* (2013.01); *G02B 7/026* (2013.01)

(58) Field of Classification Search
 CPC .......... G02B 7/00; G02B 7/026; G02B 7/025; G02B 7/021
 USPC ....................................................... 359/830
 See application file for complete search history.

(56) References Cited

U.S. PATENT DOCUMENTS

| | | | |
|---|---|---|---|
| 5,973,861 A * | 10/1999 | Dross | G02B 7/10 359/822 |
| 7,626,773 B2 | 12/2009 | Noda et al. | |
| 9,354,444 B2 | 5/2016 | Lin | |
| 9,612,437 B1 | 4/2017 | Chou et al. | |

(Continued)

FOREIGN PATENT DOCUMENTS

| | | |
|---|---|---|
| CN | 106324784 A | 1/2017 |
| CN | 107608047 A | 1/2018 |

(Continued)

*Primary Examiner* — William R Alexander
(74) *Attorney, Agent, or Firm* — McClure, Qualey & Rodack, LLP

(57) ABSTRACT

A plastic lens barrel includes an object-end portion, an image-end portion and a tube portion. The object-end portion has an object-end outer surface, an object-end opening and an object-end inner surface, wherein one end of the object-end inner surface is connected to the object-end outer surface and surrounds the object-end opening. The image-end portion has an image-end outer surface and an image-end opening. The tube portion connected object-end portion and the image-end portion, and includes a plurality of tube inner surfaces. At least one of the tube inner surfaces and the object-end inner surface includes a plurality of annular convex structures. Each of the annular convex structures surrounds a central axis of the plastic lens barrel. A cross-sectional plane of each annular convex structure passing through the central axis includes a peak point and two valley point.

16 Claims, 24 Drawing Sheets

(56) References Cited

U.S. PATENT DOCUMENTS

| | | |
|---|---|---|
| 10,139,526 B2 | 11/2018 | Chou |
| 10,281,676 B2 | 5/2019 | Lin et al. |
| 10,520,652 B2 | 12/2019 | Wan |
| 10,656,370 B2 | 5/2020 | Wan |
| 2009/0244735 A1* | 10/2009 | Sasaki .............. G02B 7/021 359/830 |
| 2012/0162795 A1* | 6/2012 | Yoshimura .......... G02B 13/001 359/830 |
| 2013/0342818 A1* | 12/2013 | Shen .............. G03B 21/145 353/100 |
| 2015/0198779 A1* | 7/2015 | Cho .............. G02B 7/021 359/830 |
| 2015/0253532 A1 | 9/2015 | Lin |
| 2015/0331219 A1 | 11/2015 | Chen et al. |
| 2016/0085046 A1* | 3/2016 | Kim .............. G02B 7/026 359/830 |
| 2016/0178805 A1 | 6/2016 | Kang et al. |
| 2016/0370579 A1 | 12/2016 | Cho et al. |
| 2017/0011245 A1 | 1/2017 | Wittenberg et al. |
| 2017/0255000 A1 | 9/2017 | Ottl et al. |
| 2018/0003916 A1 | 1/2018 | Lin et al. |
| 2018/0203222 A1* | 7/2018 | Fuhrmann ............. F41G 1/38 |
| 2018/0239103 A1 | 8/2018 | DeAngelo |
| 2018/0299590 A1 | 10/2018 | Wan |
| 2018/0299591 A1 | 10/2018 | Wei |
| 2018/0299634 A1 | 10/2018 | Wan |
| 2018/0299639 A1 | 10/2018 | Wan |
| 2018/0307008 A1 | 10/2018 | Gutierrez |
| 2018/0348479 A1 | 12/2018 | Kasama |
| 2020/0057285 A1 | 2/2020 | Ma |
| 2020/0209441 A1 | 7/2020 | Chen et al. |
| 2020/0209510 A1 | 7/2020 | Ma |
| 2020/0209597 A1 | 7/2020 | Ma |

FOREIGN PATENT DOCUMENTS

| | | |
|---|---|---|
| TW | M481412 U | 7/2014 |
| TW | M517334 U | 2/2016 |
| TW | M519751 U | 4/2016 |

* cited by examiner

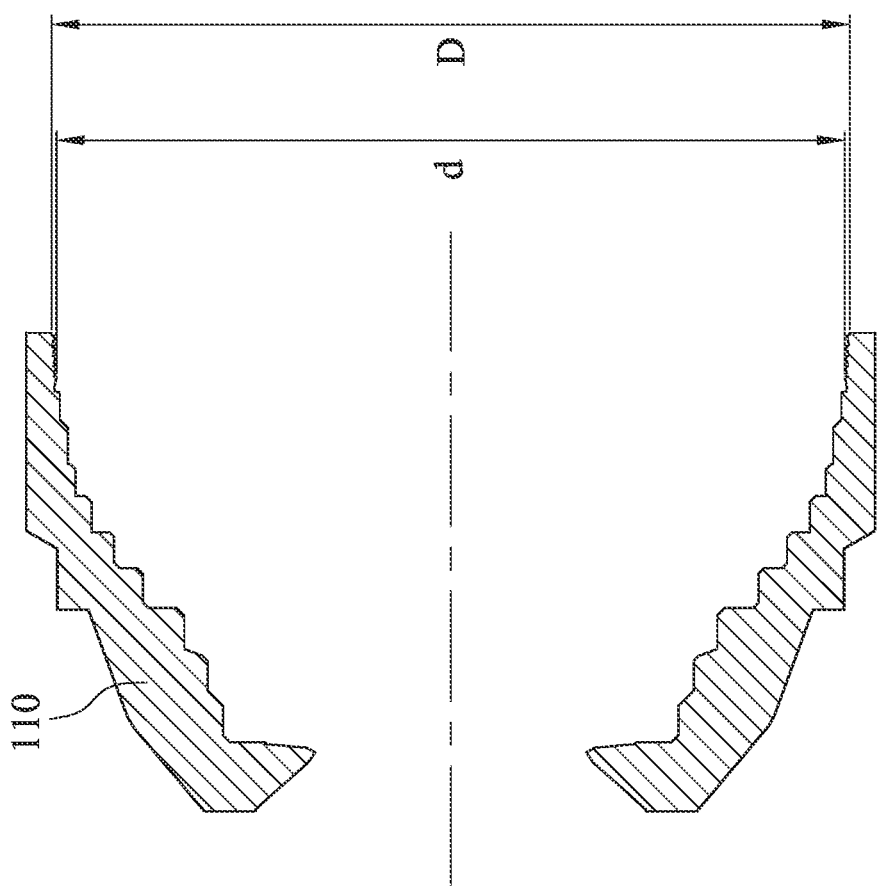

PLASTIC LENS BARREL, IMAGING LENS MODULE AND ELECTRONIC DEVICE

RELATED APPLICATIONS

The present application is a continuation of the application Ser. No. 16/655,485, filed Oct. 17, 2019, which claims priority to Taiwan Application Serial Number 108102307, filed Jan. 21, 2019, which is herein incorporated by reference.

BACKGROUND

Technical Field

The present disclosure relates to a plastic lens barrel and an imaging lens module. More particularly, the present disclosure relates to a plastic lens barrel and an imaging lens module applicable to portable electronic devices.

Description of Related Art

In recent years, the portable electronic devices have been developed rapidly, such as smart devices, tablets and so on. These portable electronic devices have been full of daily lives of modern people, and the camera module loaded on the portable electronic devices thrives on it. The demand for quality of the camera module increases along with the advances in technology. Therefore, the camera module needs to be improved not only on the quality of the optical design but manufacturing assembling precision.

FIG. 10 is a schematic view of an imaging lens module 10 applied to camera module in the conventional art. In FIG. 10, the imaging lens module 10 includes a lens barrel 11 and a plurality of optical elements 12 (such as lens elements, light shielding sheets), wherein the optical elements 12 are disposed in the lens barrel 11. The lens barrel 11 is made by an injection molding, and an inner surface thereof is arranged with a plurality of stepped structures 11a. However, each of the stepped structures 11a does not have obvious peak point and valley points, the positions 11b, and 11c thereof projecting on the optical axis overlap to each other. Hence, the image would be affected by the stray light, so as to affect the image quality.

SUMMARY

According to one aspect of the present disclosure, a plastic lens barrel includes an object-end portion, an image-end portion, and a tube portion. The object-end portion has an object-end outer surface, an object-end opening, and an object-end inner surface, wherein one end of the object-end inner surface is connected to the object-end outer surface and surrounds the object-end opening. The image-end portion has an image-end outer surface and an image-end opening. The tube portion connects the object-end portion and the image-end portion, and includes a plurality of tube inner surfaces, wherein at least one of the tube inner surfaces and the object-end inner surface includes a plurality of annular convex structures, each of the annular convex structures surrounds a central axis of the plastic lens barrel, and a cross-sectional plane of each of the annular convex structures passing through the central axis includes a peak point and two valley points. The peak point is a closest point to the central axis on each of the annular convex structures. Projecting positions of the two valley points on the central axis are located on two sides of a projecting position of the peak point on the central axis, and the projecting positions of the two valley points on the central axis do not overlap with the projecting position of the peak point on the central axis.

According to another aspect of the present disclosure, an imaging lens module includes the plastic lens barrel of the aforementioned aspect and an optical lens assembly, wherein the optical lens assembly is disposed in the plastic lens barrel.

According to another aspect of the present disclosure, an electronic device includes the imaging lens module of the aforementioned aspect.

BRIEF DESCRIPTION OF THE DRAWINGS

The present disclosure can be more fully understood by reading the following detailed description of the embodiment, with reference made to the accompanying drawings as follows:

FIG. 1E is a schematic view of parameters d, and D according to the 1st embodiment.

DETAILED DESCRIPTION

Figure 1A:
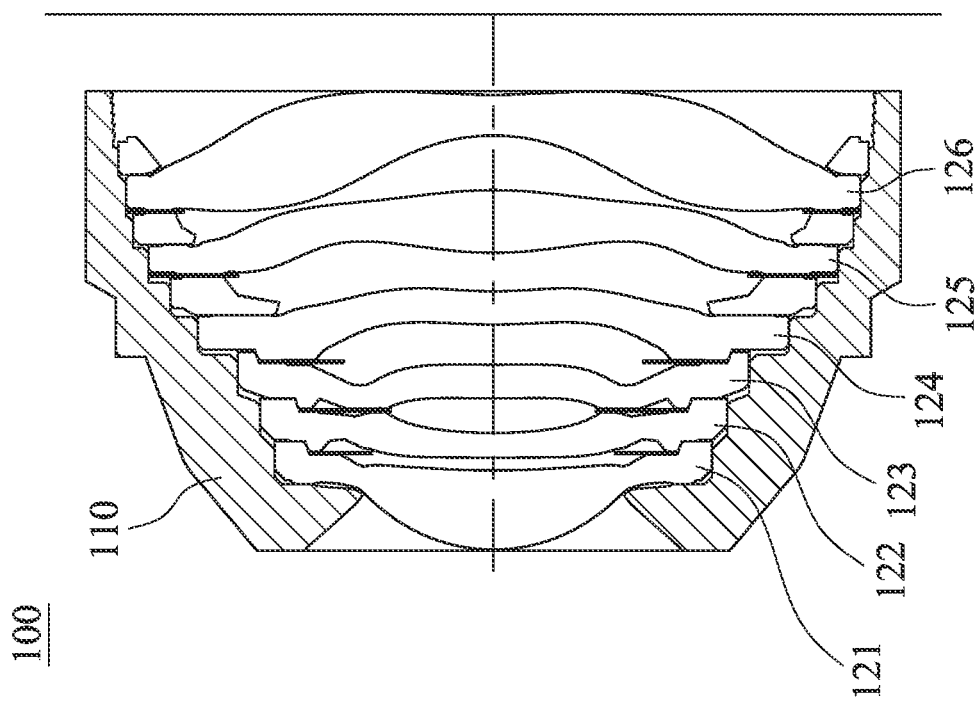
FIG. 1A is a schematic view of an imaging lens module according to the 1st embodiment of the present disclosure.

The present disclosure provides a plastic lens barrel, including an object-end portion, an image-end portion, and a tube portion. The object-end portion has an object-end outer surface, an object-end opening, and an object-end inner surface, wherein one end of the object-end inner surface is connected to the object-end outer surface and surrounds the object-end opening. The image-end portion has an image-end outer surface and an image-end opening. The tube portion connects the object-end portion and the image-end portion, and includes a plurality of tube inner surfaces, wherein at least one of the tube inner surfaces and the object-end inner surface includes a plurality of annular convex structures, each of the annular convex structures surrounds a central axis of the plastic lens barrel, and a cross-sectional plane of each of the annular convex structures passing through the central axis includes a peak point and two valley points. The peak point is a closest point to the central axis on each of the annular convex structures. Projecting positions of the two valley points on the central axis are located on two sides of a projecting position of the peak point on the central axis, and the projecting positions of the two valley points on the central axis do not overlap with the projecting position of the peak point on the central axis. Therefore, an elastic drafting structure with reversed hook-shaped can be formed. It is favorable for obtaining an appearance of injection molding which has been considered to be difficult to form by utilizing the elastic plastic which has just been formed via injection molding. Moreover, it is favorable for achieving an ideal improvement in the potential surface reflection by arranging the tube inner surfaces of the plastic lens barrel with reversed hook-shaped without adding more complex mold designs and correspondingly expensive mold costs, so as to transfer the inevitable reflection of the stray light of the tube inner surfaces into the reversed hook structure which can be considered as entering into the light trap so as to eliminate the original stray light projecting on the image surface.

The annular convex structures and the plastic lens barrel can be integrally formed. Therefore, it is favorable for reducing the cost of optimizing design of the plastic lens barrel by more easily applying to the plastic lens barrel with the countermeasure for eliminating stray light of the tube inner surfaces.

Each of the projecting positions of the peak points on the central axis does not overlap with each of the projecting positions of the valley points on the central axis. Therefore, it is favorable for making the light trap structure more stereoscopic without being limited by drafting requirements of the conventional injection molding.

Projecting positions of the two valley points on an axis vertical to the central axis do not overlap with projecting position of the peak point on the axis vertical to the central axis. Therefore, it is favorable for significantly improving the success rate of injection molding products and the quality of mass production by greatly reducing the collision and interference in the drafting step between the plastic lens barrel and the corresponding mold.

A distance between the projecting position of one of the two valley points on the central axis and the projecting position of the peak point on the central axis is different from a distance between the projecting position of the other one of the two valley points on the central axis and the projecting position of the peak point on the central axis. Therefore, it is favorable for adjusting to the appropriate structure in response to the conditions of injection molding by designing the annular convex structures as a steep slope structure so as to increase the feasibility of mass production.

The two valley points are a first valley point and a second valley point, respectively, and a distance between a projecting position of the first valley point on the central axis and the projecting position of the peak point on the central axis is larger than a distance between a projecting position of the second valley point on the central axis and the projecting position of the peak point on the central axis. Therefore, it is favorable for obtaining the depth of light trap and the requirement of elastic drafting structure being considered in a drafting stage by maintaining different distances.

When the distance between the projecting position of the first valley point on the central axis and the projecting position of the peak point on the central axis is DG1, and the distance between the projecting position of the second valley point on the central axis and the projecting position of the peak point on the central axis is DG2, the following condition is satisfied: $1.1 < DG1/DG2 < 25.0$. Therefore, the arrangement of light trap can become more ideal and the plastic structure of elastic drafting would not be destroyed. Furthermore, the following condition can be satisfied: $1.8 < DG1/DG2 < 17.0$. Therefore, it is favorable for obtaining more adjustable margin from controlling the variables by the molding mold.

Each of the annular convex structures can have a smooth surface. Therefore, it is favorable for increasing manufacturing speed by reducing the processing steps of the surface treatment.

When a maximum opening diameter of the annular convex structures is D, a minimum opening diameter of the annular convex structures is d, and an elastic drafting ratio of the annular convex structures is EDR, the following condition is satisfied: $0\% < EDR < 12\%$, wherein $EDR = [(D-d)/D] \times 100\%$. Therefore, the function of the elastic drafting structure can be more ideally. Furthermore, the following condition can be satisfied: $0\% < EDR < 8\%$. Therefore, it is favorable for avoiding unexpected destruction in the drafting stage which would result in losing functions of the light traps. In detail, the value of EDR can be changed to a feasible proportion according to the arrangement of the plastic lens barrel. The non-closed annular convex structure, the non-closed image-end inner surface or the non-closed tube inner surfaces will change the feasible range of EDR, but is not limited thereto.

The two valley points of each of the annular convex structures are farther from the central axis than the peak point of each of the annular convex structures is thereto. Therefore, the appearance near the peak point would be sharper, so that it is not easy to appear tiny planes or gentle slopes, or the like, which would cause the annular convex structure to illuminate after illumination and increase unnecessary appearance of abnormalities.

The peak point of each of the annular convex structures is gradually away from the central axis from the object-end portion to the image-end portion or from the image-end portion to the object-end portion. Therefore, it is favorable for reducing the number of collisions that each of the annular convex structures is subjected to during the drafting, so as to improve the success rate.

In each of the annular convex structures, when a maximum distance between the projecting position of each of the valley points and the projecting position of the peak point on the axis vertical to the central axis is HG, the following condition is satisfied: 0.002 mm<HG<0.15 mm. Therefore, it is favorable for reducing the degree of surface reflection and being not easy to increase the failure rate when drafting.

The present disclosure further provides an imaging lens module, including the aforementioned plastic lens barrel and an optical lens assembly, wherein the optical lens assembly is disposed in the plastic lens barrel. Therefore, it is favorable for improving the image quality of the imaging lens module.

The imaging lens module can further include a retaining ring, wherein the retaining ring is for fixing the optical lens assembly in the plastic lens barrel. Therefore, it is favorable for avoiding surface reflection between lens elements when space of lens elements between the optical lens elements changes.

The imaging lens module can further include a glue disposed between at least one of the annular convex structures and the retaining ring. Therefore, it is favorable for accumulating the glue around the retaining ring with the annular convex structures having a reversed hook structure, so that the glue would not easily overflow to the lens elements and contaminate the lens elements, and would not easily overflow to the outside of the plastic lens barrel to affect the appearance of the plastic lens barrel.

The annular convex structures can be not contacted with the optical lens assembly. Therefore, it is favorable for avoiding destroying the annular convex structure during the assembling process of the optical lens elements so as to affect the expected effect.

Each of the aforementioned features of the plastic lens barrel and the imaging lens module can be utilized in various combinations for achieving the corresponding effects.

The present disclosure further provides an electronic device, including the aforementioned imaging lens module. Therefore, an electronic device having both image quality and manufacturing stability can be provided.

According to the above embodiment, specific embodiments are set forth below and described in detail in conjunction with the drawings.

1st Embodiment

Figure 1B:
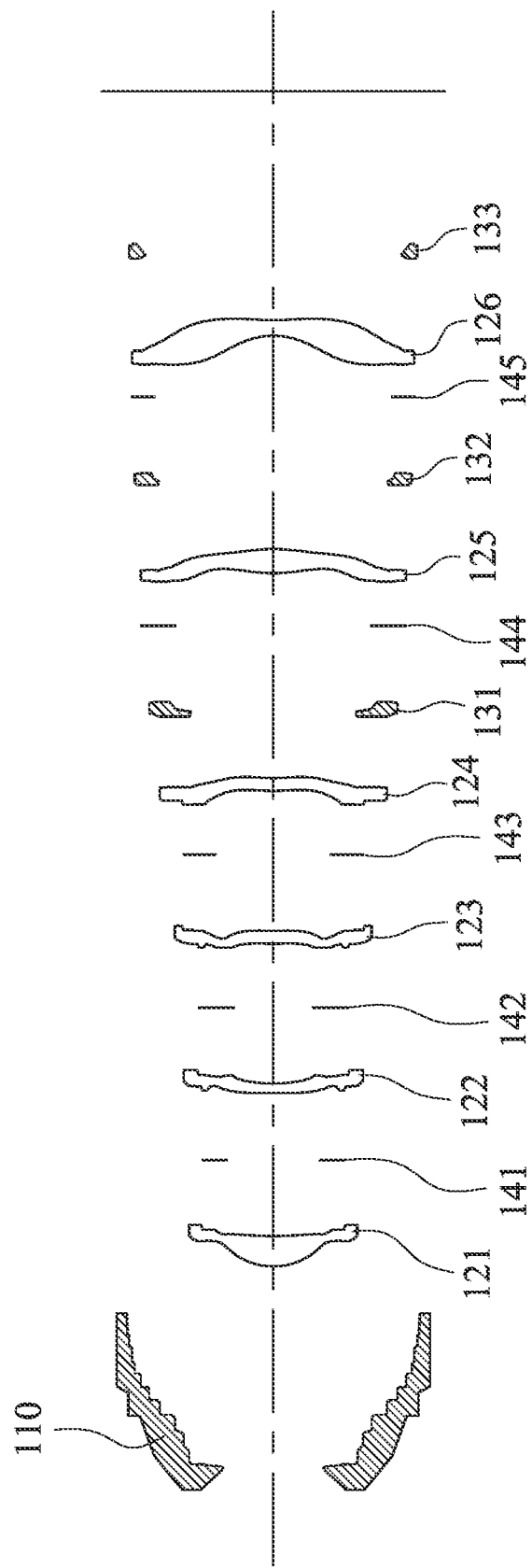
FIG. 1B is an exploded view of the imaging lens module according to the 1st embodiment in FIG. 1A.

FIG. 1A is a schematic view of an imaging lens module 100 according to the 1st embodiment of the present disclosure. FIG. 1B is an exploded view of the imaging lens module 100 according to the 1st embodiment in FIG. 1A. In FIG. 1A and FIG. 1B, the imaging lens module 100 includes a plastic lens barrel 110 and optical lens assembly (its reference numeral is omitted), wherein the optical lens assembly is disposed in the plastic lens barrel 110.

In detail, in the 1st embodiment, the optical lens assembly includes, in order from the object side to the image side, six lens elements 121, 122, 123, 124, 125, 126, and the imaging lens module 100 further includes three retaining rings 131, 132, 133 for fixing the optical lens assembly in the plastic lens barrel 110. Moreover, the imaging lens module 100 can further include five light shielding sheets 141, 142, 143, 144, 145, which can be respectively disposed between any two adjacent lens elements or retaining rings. In the 1st embodiment, the detailed arrangement of the retaining rings 131, 132, 133, and the light shielding sheets 141, 142, 143, 144, 145 is as shown in FIG. 1A and FIG. 1B, but will not be described in detail herein. The arrangement of the lens elements, the retaining rings and the light shielding sheets in the imaging lens module of the present disclosure is not limited to the 1st embodiment.

Figure 1C:
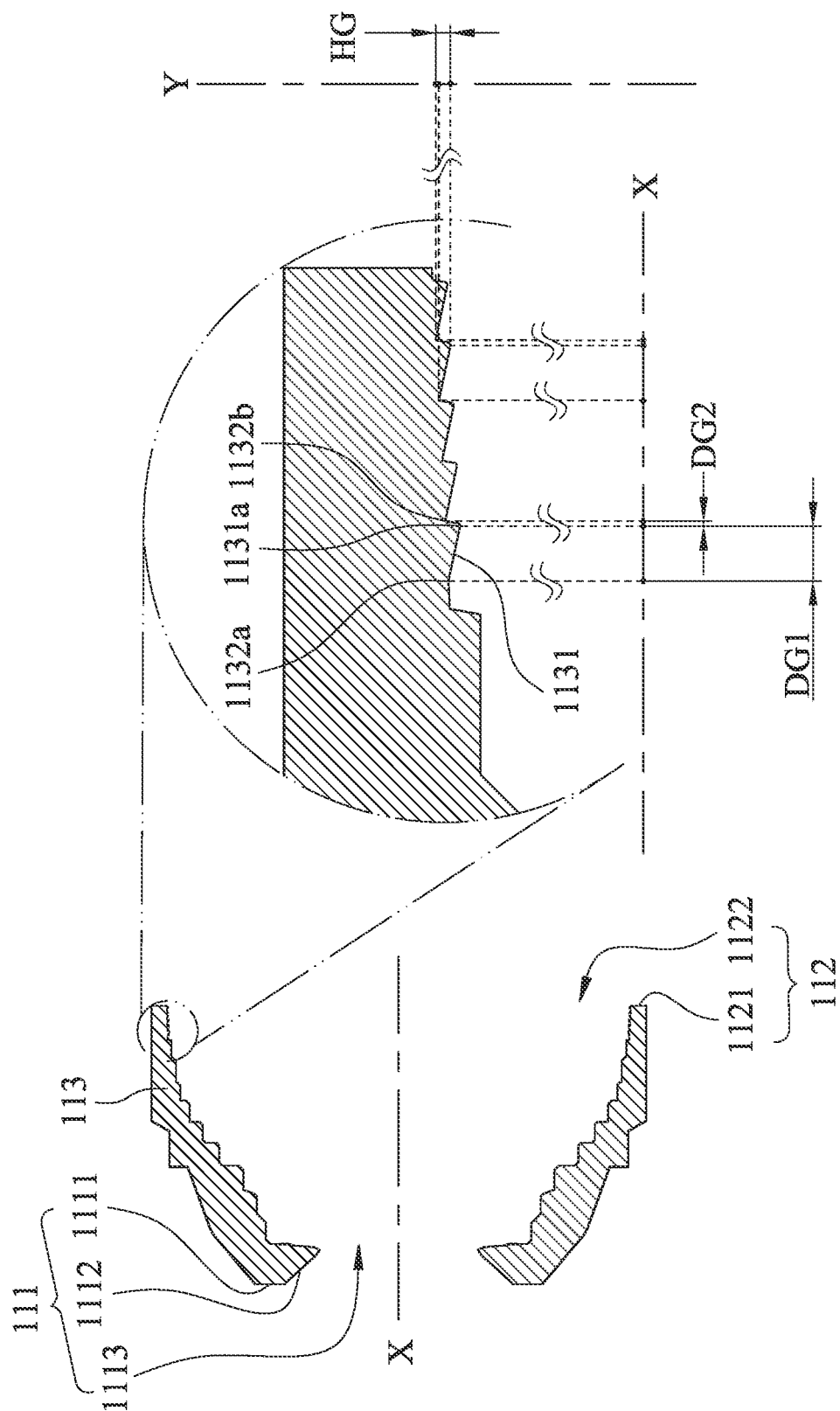
FIG. 1C is a planar cross-sectional view of a plastic lens barrel according to the 1st embodiment in FIG. 1A.
Figure 1D:
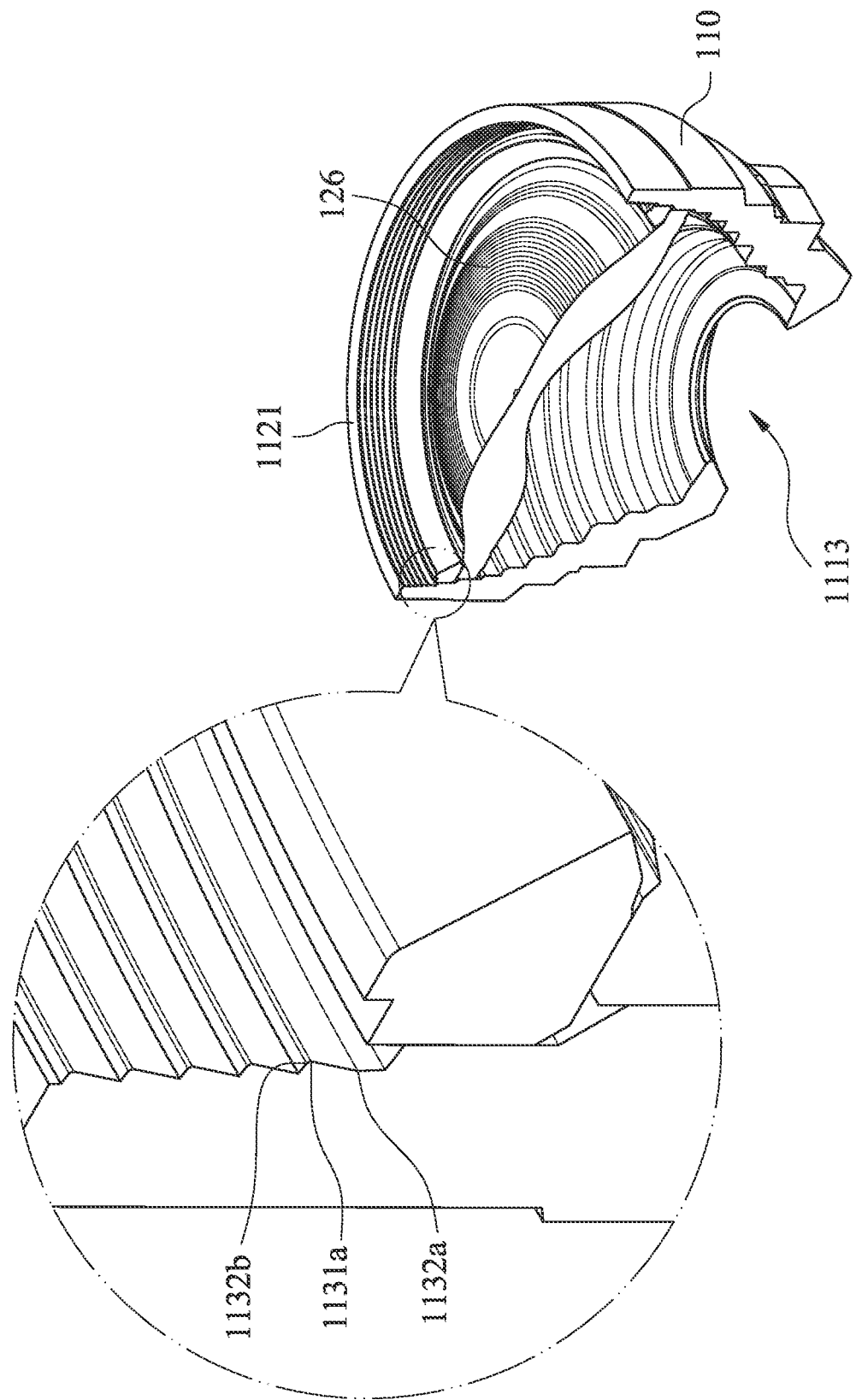
FIG. 1D is a three-dimensional view of the plastic lens barrel according to the 1st embodiment in FIG. 1A.

FIG. 1C is a planar cross-sectional view of the plastic lens barrel 110 according to the 1st embodiment in FIG. 1A. FIG. 1D is a three-dimensional view of the plastic lens barrel 110 according to the 1st embodiment in FIG. 1A. In FIG. 1C and FIG. 1D, the plastic lens barrel 110 includes an object-end portion 111, an image-end portion 112, and a tube portion 113, wherein the tube portion 113 is connected to the object-end portion 111 and the image-end portion 112. The object-end portion 111 has an object-end outer surface 1111, an object-end opening 1113, and an object-end inner surface 1112, wherein one end of the object-end inner surface 1112 is connected to the object-end outer surface 1111 and surrounds the object-end opening 1113. The image-end portion 112 has an image-end outer surface 1121 and an image-end opening 1122. The tube portion 113 includes a plurality of the tube inner surfaces (its reference numeral is omitted), wherein one tube inner surface includes a plurality of the annular convex structures 1131, and each of the annular convex structures 1131 surrounds the central axis X of the plastic lens barrel 110. In the 1st embodiment, the annular convex structures 1131 and the plastic lens barrel 110 are integrally formed, and each of the annular convex structures 1131 has a smooth surface. The annular convex structures 1131 are not contacted with the optical lens assembly by the arrangement of the retaining ring 133.

Each of the annular convex structures 1131 includes a peak point 1131a and two valley points (that is, 1132a, 1132b) through a cross section of the central axis X. The peak point 1131a is the closest point to the central axis X on each of the annular convex structures 1131. The projecting positions of the two valley points on the central axis X are located on two sides of the projecting position of the peak point 1131a on the central axis X, wherein the projecting positions of the two valley points on the central axis X do not overlap with the projecting position of the peak point 1131a on the central axis X. In detail, each of the projecting positions of the peak points 1131a on the central axis X does not overlap with each of the projecting positions of the valley points on the central axis X, and the two valley points of each of the annular convex structures 1131 are farther from the central axis X than the peak point 1131a of each of the annular convex structures 1131 is thereto.

Moreover, please refer to FIG. 1C, the projecting positions of the two valley points on an axis vertical to the central axis X do not overlap with projecting position of the peak point 1131a on the axis vertical to the central axis X; that is, projecting positions of the two valley points on an virtual line Y do not overlap with projecting position of the peak point 1131a on the virtual line Y, and the virtual line Y is perpendicular to the central axis X.

A distance between the projecting position of one of the two valley points on the central axis X and the projecting position of the peak point 1131a on the central axis X is different from a distance between the projecting position of the other one of the two valley points on the central axis X and the projecting position of the peak point 1131a on the central axis X. In the 1st embodiment, the two valley points are a first valley point 1132a and a second valley point 1132b, respectively. A distance between a projecting position of the first valley point 1132a on the central axis X and the projecting position of the peak point 1131a on the central axis X is larger than a distance between a projecting position of the second valley point 1132b on the central axis X and the projecting position of the peak point 1131a on the central axis X.

Moreover, the peak point 1131a of each of the annular convex structures 1131 is gradually away from the central axis X from the object-end portion 111 to the image-end portion 112.

FIG. 1E is a schematic view of parameters d, and D according to the 1st embodiment. In FIG. 1C and FIG. 1E, when the distance between the projecting position of the first valley point 1132a on the central axis X and the projecting position of the peak point 1131a on the central axis X is DG1, the distance between the projecting position of the second valley point 1132b on the central axis X and the projecting position of the peak point 1131a on the central axis is DG2, a maximum distance between the projecting position of each of the valley points and the projecting position of the peak point 1131a on the axis vertical to the central axis X is HG (in the 1st embodiment, that is a maximum distance between the projecting position of the second valley point 1132b and the projecting position of the peak point 1131a on the virtual line Y), the maximum opening diameter of the annular convex structures 1131 is D, the minimum opening diameter of the annular convex structures 1131 is d, and the elastic drafting ratio of the annular convex structures 1131 is EDR(EDR=[(D−d)/D]×100%), the following conditions of the Table 1 are satisfied, respectively.

TABLE 1

| 1st embodiment | | | |
|---|---|---|---|
| DG1 (mm) | 0.0915 | D(mm) | 7.71 |
| DG2 (mm) | 0.0085 | d(mm) | 7.6162 |
| DG1/DG2 | 10.765 | EDR (%) | 1.217 |
| HG (mm) | 0.0246 | | |

Figure 1F:
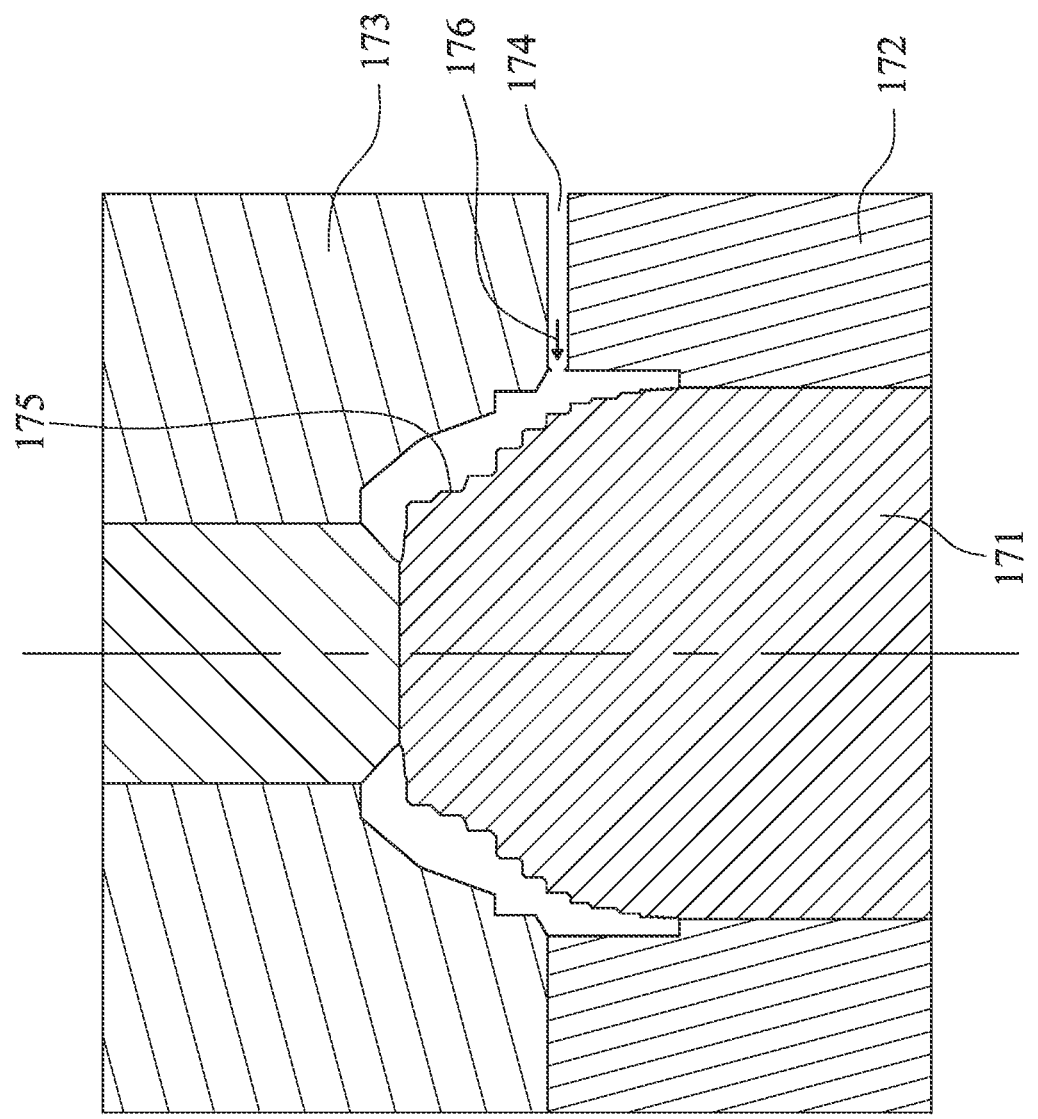
FIG. 1F is a schematic view of molds in the manufacturing process of the plastic lens barrel according to the 1st embodiment.

FIG. 1F is a schematic view of molds 171, 172, and 173 in the manufacturing process of the plastic lens barrel 110 according to the 1st embodiment. In FIG. 1F, the molds 171, 172, and 173 surround a molding injecting space 175, and an injecting channel 174 is formed between the mold 172 and the mold 173. During the molding process of the plastic lens barrel 110, the plastic material can be injected into the molding injecting space 175 along the direction 176 through the injecting channel 174. The annular convex structures 1131 and the plastic lens barrel 110 can be integrally formed by the arrangement of the mold 171. The manufacturing molding method of the following embodiments are the same as the manufacturing molding method of the 1st embodiment, and will not be described again.

2nd Embodiment

Figure 2A:
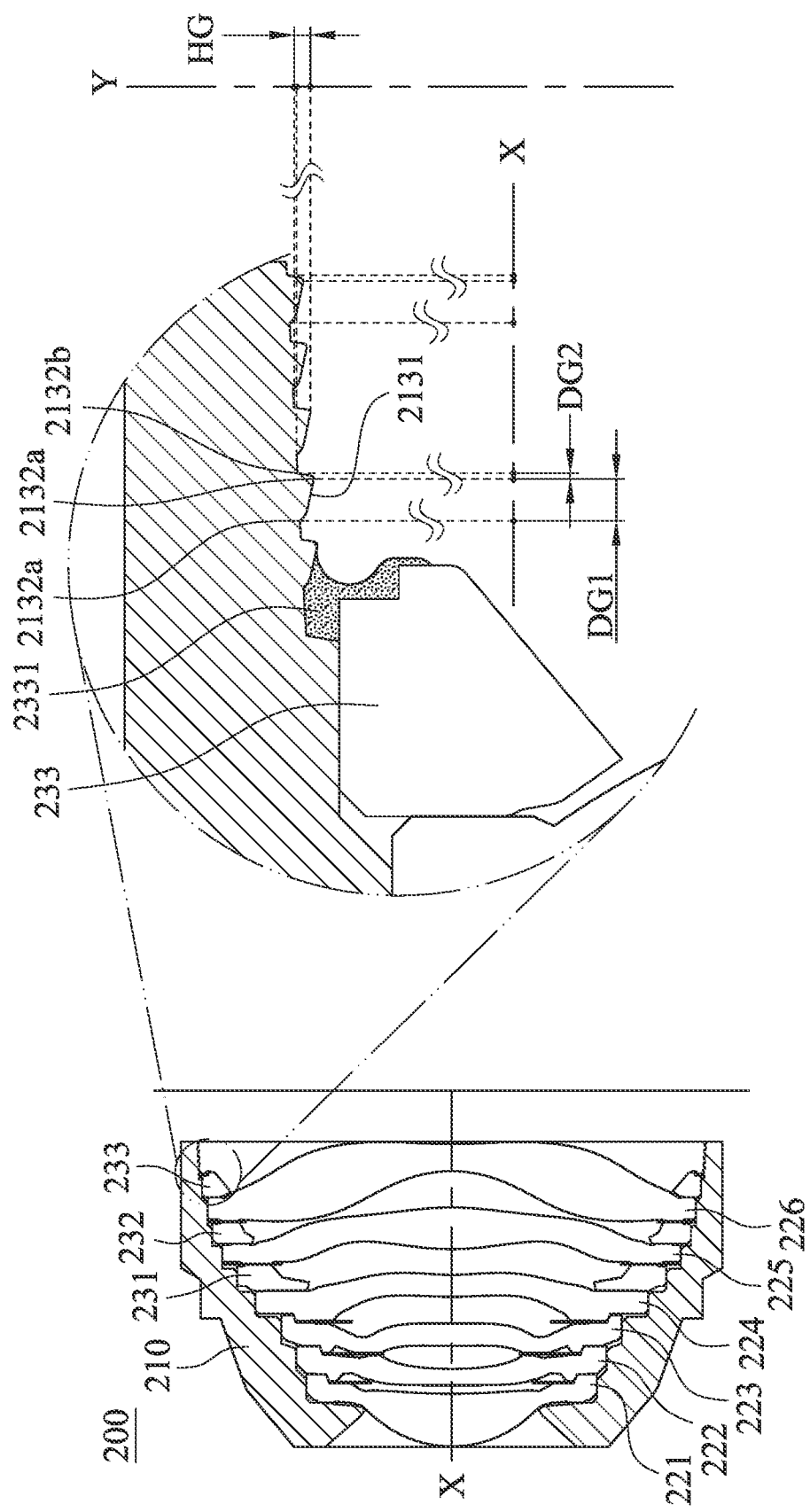
FIG. 2A is a schematic view of an imaging lens module according to the 2nd embodiment of the present disclosure.
Figure 2B:
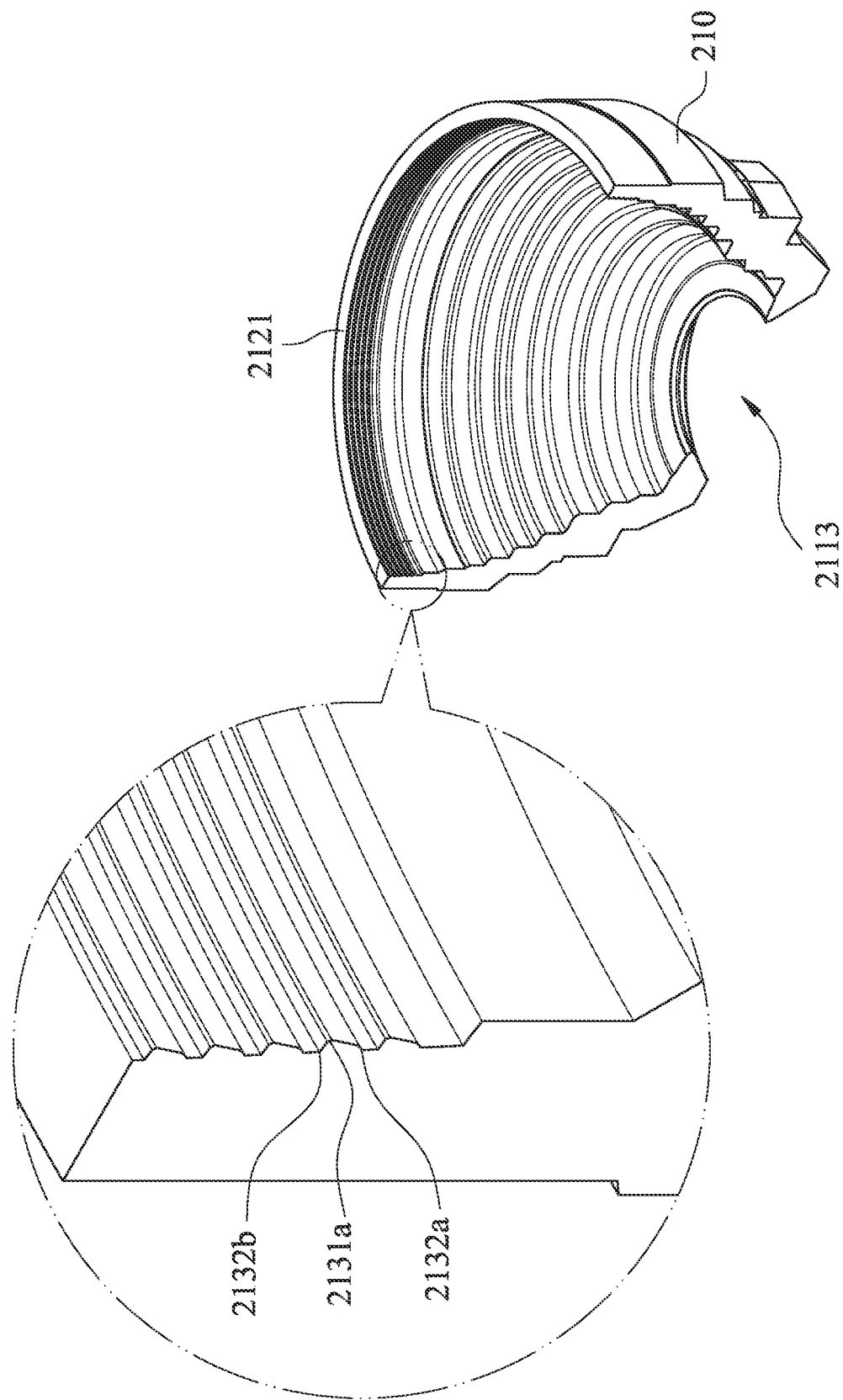
FIG. 2B is a three-dimensional view of the plastic lens barrel according to the 2nd embodiment in FIG. 2A.
Figure 2C:
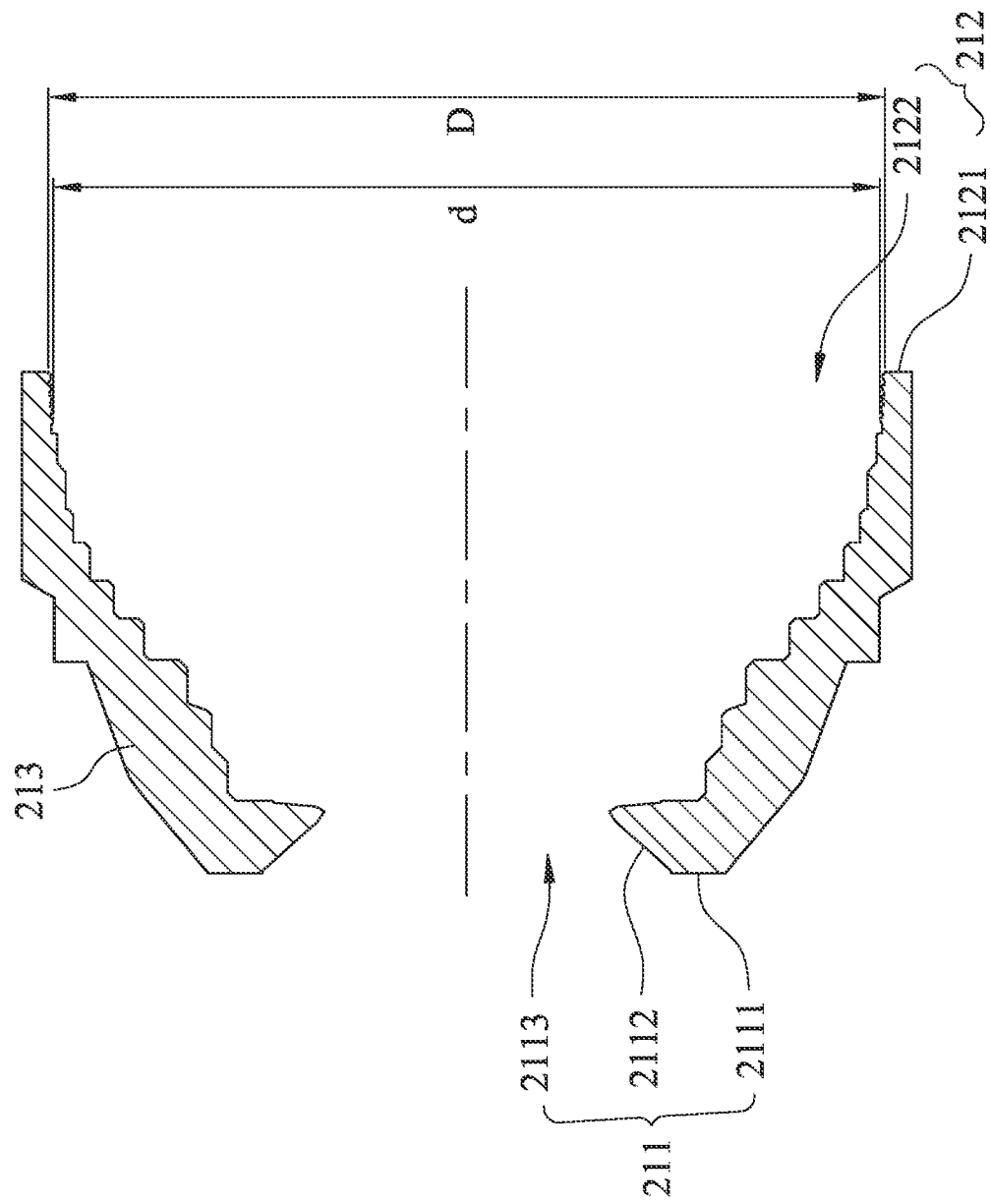
FIG. 2C is a planar cross-sectional view of the plastic lens barrel according to the 2nd embodiment in FIG. 2A.

FIG. 2A is a schematic view of an imaging lens module 200 according to the 2nd embodiment of the present disclosure. FIG. 2B is a three-dimensional view of the plastic lens barrel 210 according to the 2nd embodiment in FIG. 2A. FIG. 2C is a planar cross-sectional view of the plastic lens barrel 210 according to the 2nd embodiment in FIG. 2A. As shown in FIG. 2A, the imaging lens module 200 includes a plastic lens barrel 210 and optical lens assembly (its reference numeral is omitted), wherein the optical lens assembly is disposed in the plastic lens barrel 210.

In detail, in the 2nd embodiment, the optical lens assembly includes, in order from the object side to the image side, six lens elements 221, 222, 223, 224, 225, 226, and the imaging lens module 200 further includes three retaining rings 231, 232, 233 for fixing the optical lens assembly in the plastic lens barrel 210. Moreover, the imaging lens module 200 can further include five light shielding sheets (its reference numeral is omitted), which can be respectively disposed between any two adjacent lens elements or retaining rings. In the 2nd embodiment, the detailed arrangement of the retaining rings 231, 232, 233, and the light shielding sheet is shown in FIG. 2A, and the imaging lens module 200 can further include a glue 2331 disposed between the annular convex structure 2131 and the retaining ring 233. The arrangement of the lens elements, the retaining rings and the light shielding sheets in the imaging lens module of the present disclosure is not limited to the 2nd embodiment.

As shown in FIG. 2C, the plastic lens barrel 210 includes an object-end portion 211, an image-end portion 212, and a tube portion 213, wherein the tube portion 213 is connected to the object-end portion 211 and the image-end portion 212. The object-end portion 211 has an object-end outer surface 2111, an object-end opening 2113, and an object-end inner surface 2112, wherein one end of the object-end inner surface 2112 is connected to the object-end outer surface 2111 and surrounds the object-end opening 2113. The image-end portion 212 has an image-end outer surface 2121 and an image-end opening 2122. The tube portion 213 includes a plurality of the tube inner surfaces (its reference numeral is omitted), wherein one tube inner surface includes a plurality of the annular convex structures 2131, and each of the annular convex structures 2131 surrounds the central axis X of the plastic lens barrel 210. In the 2nd embodiment, the annular convex structures 2131 and the plastic lens barrel 210 are integrally formed, and each of the annular convex structures 2131 has a smooth surface. The annular convex structures 2131 are not contacted with the optical lens assembly by the arrangement of the retaining ring 233.

In FIG. 2A and FIG. 2B, each of the annular convex structures 2131 includes a peak point 2131a and two valley points (that is, 2132a, 2132b) through a cross section of the central axis X. The peak point 2131a is the closest point to the central axis X on each of the annular convex structures 2131. The projecting positions of the two valley points on the central axis X are located on two sides of the projecting position of the peak point 2131a on the central axis X, wherein the projecting positions of the two valley points on the central axis X do not overlap with the projecting position of the peak point 2131a on the central axis X. In detail, each of the projecting positions of the peak points 2131a on the central axis X does not overlap with each of the projecting positions of the valley points on the central axis X, and the two valley points of each of the annular convex structures 2131 are farther from the central axis X than the peak point 2131a of each of the annular convex structures 2131 is thereto.

Moreover, please refer to FIG. 2A, the projecting positions of the two valley points on an axis vertical to the central axis X do not overlap with projecting position of the peak point 2131a on the axis vertical to the central axis X; that is, projecting positions of the two valley points on an virtual line Y do not overlap with projecting position of the peak point 2131a on the virtual line Y, and the virtual line Y is perpendicular to the central axis X.

A distance between the projecting position of one of the two valley points on the central axis X and the projecting position of the peak point 2131a on the central axis X is different from a distance between the projecting position of the other one of the two valley points on the central axis X and the projecting position of the peak point 2131a on the central axis X. In the 2nd embodiment, the two valley points are a first valley point 2132a and a second valley point 2132b, respectively. A distance between a projecting position of the first valley point 2132a on the central axis X and the projecting position of the peak point 2131a on the central axis X is larger than a distance between a projecting position of the second valley point 2132b on the central axis X and the projecting position of the peak point 2131a on the central axis X.

Moreover, the peak point 2131a of each of the annular convex structures 2131 is gradually away from the central axis X from the object-end portion 211 to the image-end portion 212.

As shown in FIG. 2A and FIG. 2C, when the distance between the projecting position of the first valley point 2132a on the central axis X and the projecting position of the peak point 2131a on the central axis X is DG1, the distance between the projecting position of the second valley point 2132b on the central axis X and the projecting position of the peak point 2131a on the central axis is DG2, a maximum distance between the projecting position of each of the valley points and the projecting position of the peak point 2131a on the axis vertical to the central axis X is HG (in the 2nd embodiment, that is a maximum distance between the projecting position of the second valley point 2132b and the projecting position of the peak point 2131a on the axis vertical to the central axis X), the maximum opening diameter of the annular convex structures 2131 is D, the minimum opening diameter of the annular convex structures 2131 is d, and the elastic drafting ratio of the annular convex structures 2131 is EDR(EDR=[(D−d)/D]×100%), the following conditions of the Table 2 are satisfied, respectively.

TABLE 2

| 2nd embodiment | | | |
|---|---|---|---|
| DG1 (mm) | 0.0638 | D(mm) | 7.71 |
| DG2 (mm) | 0.0085 | d(mm) | 7.6162 |
| DG1/DG2 | 7.506 | EDR (%) | 1.217 |
| HG (mm) | 0.0246 | | |

3rd Embodiment

Figure 3A:
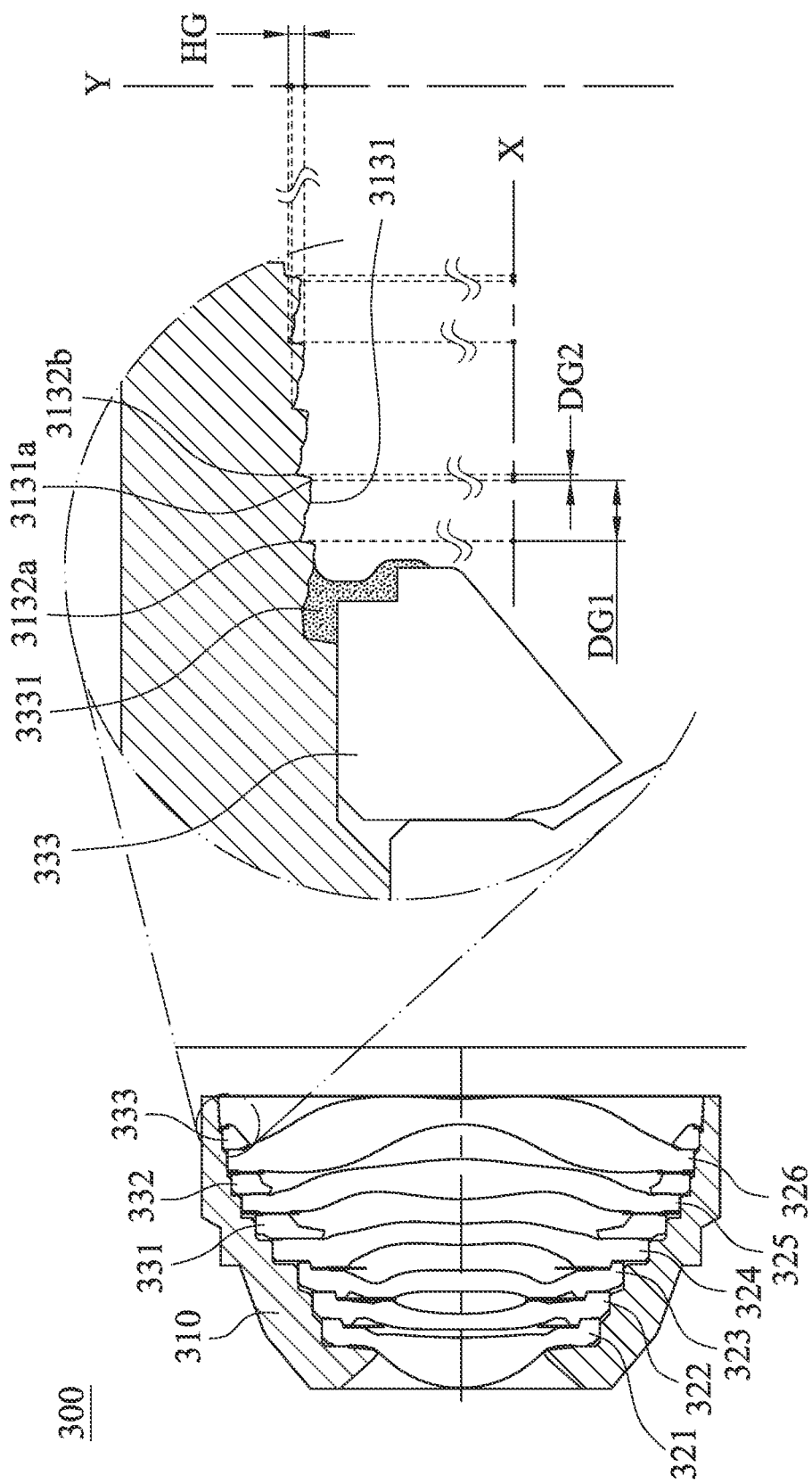
FIG. 3A is a schematic view of an imaging lens module according to the 3rd embodiment of the present disclosure.
Figure 3B:
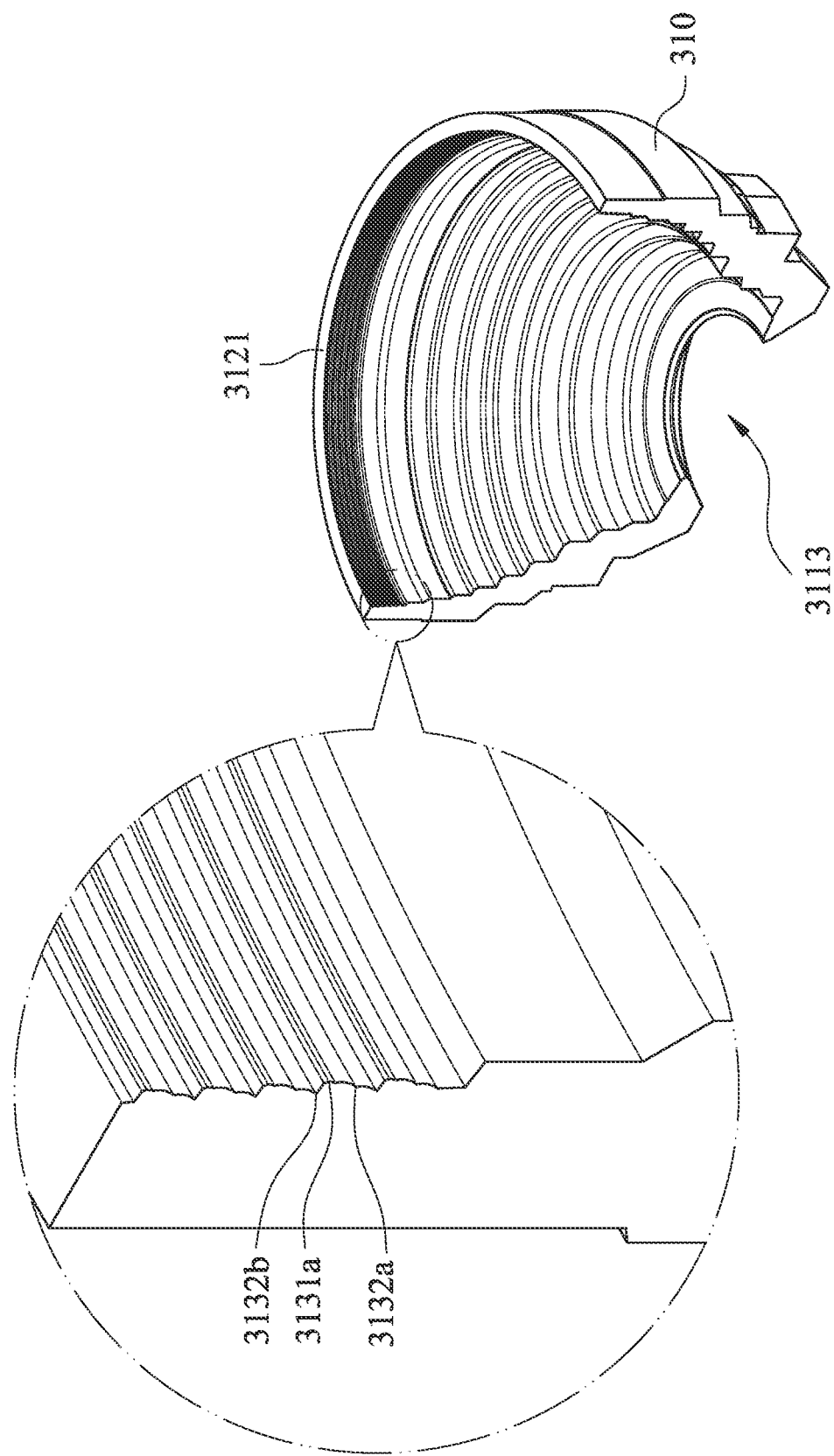
FIG. 3B is a three-dimensional view of the plastic lens barrel according to the 3rd embodiment in FIG. 3A.
Figure 3C:
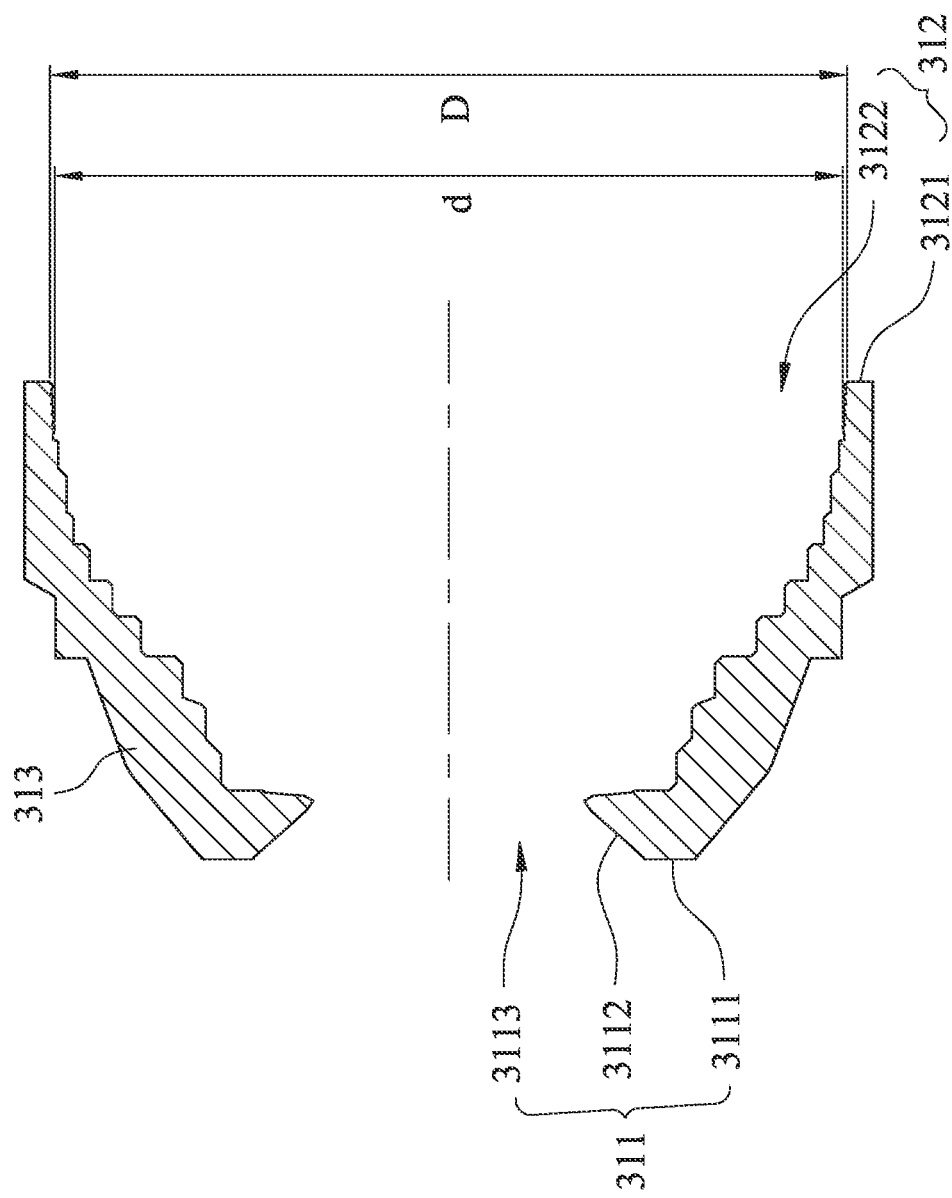
FIG. 3C is a planar cross-sectional view of the plastic lens barrel according to the 3rd embodiment in FIG. 3A.

FIG. 3A is a schematic view of an imaging lens module 300 according to the 3rd embodiment of the present disclosure. FIG. 3B is a three-dimensional view of the plastic lens barrel 310 according to the 3rd embodiment in FIG. 3A. FIG. 3C is a planar cross-sectional view of the plastic lens barrel 310 according to the 3rd embodiment in FIG. 3A. As shown in FIG. 3A, the imaging lens module 300 includes a plastic lens barrel 310 and optical lens assembly (its reference numeral is omitted), wherein the optical lens assembly is disposed in the plastic lens barrel 310.

In detail, in the 3rd embodiment, the optical lens assembly includes, in order from the object side to the image side, six lens elements 321, 322, 323, 324, 325, 326, and the imaging lens module 300 further includes three retaining rings 331, 332, 333 for fixing the optical lens assembly in the plastic lens barrel 310. Moreover, the imaging lens module 300 can further include five light shielding sheets (its reference numeral is omitted), which can be respectively disposed between any two adjacent lens elements or retaining rings. In the 3rd embodiment, the detailed arrangement of the retaining rings 331, 332, and 333, and the light shielding sheet is as shown in FIG. 3A, and the imaging lens module 300 can further include a glue 3331 disposed between the annular convex structure 3131 and the retaining ring 333. The arrangement of the lens elements, the retaining rings and the light shielding sheets in the imaging lens module of the present disclosure is not limited to the 3rd embodiment.

As shown in FIG. 3C, the plastic lens barrel 310 includes an object-end portion 311, an image-end portion 312, and a tube portion 313, wherein the tube portion 313 is connected to the object-end portion 311 and the image-end portion 312. The object-end portion 311 has an object-end outer surface 3111, an object-end opening 3113, and an object-end inner surface 3112, wherein one end of the object-end inner surface 3112 is connected to the object-end outer surface 3111 and surrounds the object-end opening 3113. The image-end portion 312 has an image-end outer surface 3121 and an image-end opening 3122. The tube portion 313 includes a plurality of the tube inner surfaces (its reference numeral is omitted), wherein one tube inner surface includes a plurality of the annular convex structures 3131, and each of the annular convex structures 3131 surrounds the central axis X of the plastic lens barrel 310. In the 3rd embodiment, the annular convex structures 3131 and the plastic lens barrel 310 are integrally formed, and each of the annular convex structures 3131 has a smooth surface. The annular convex structures 3131 are not contacted with the optical lens assembly by the arrangement of the retaining ring 333.

In FIG. 3A and FIG. 3B, each of the annular convex structures 3131 includes a peak point 3131a and two valley points (that is, 3132a, 3132b) through a cross section of the central axis X. The peak point 3131a is the closest point to the central axis X on each of the annular convex structures 3131. The projecting positions of the two valley points on the central axis X are located on two sides of the projecting position of the peak point 3131a on the central axis X, wherein the projecting positions of the two valley points on the central axis X do not overlap with the projecting position of the peak point 3131a on the central axis X. In detail, each of the projecting positions of the peak points 3131a on the central axis X does not overlap with each of the projecting positions of the valley points on the central axis X, and the two valley points of each of the annular convex structures 3131 are farther from the central axis X than the peak point 3131a of each of the annular convex structures 3131 is thereto.

Moreover, please refer to FIG. 3A, the projecting positions of the two valley points on an axis vertical to the central axis X do not overlap with projecting position of the peak point 3131a on the axis vertical to the central axis X; that is, projecting positions of the two valley points on an virtual line Y do not overlap with projecting position of the peak point 3131a on the virtual line Y, and the virtual line Y is perpendicular to the central axis X.

A distance between the projecting position of one of the two valley points on the central axis X and the projecting position of the peak point 3131a on the central axis X is different from a distance between the projecting position of the other one of the two valley points on the central axis X and the projecting position of the peak point 3131a on the central axis X. In the 3rd embodiment, the two valley points are a first valley point 3132a and a second valley point 3132b, respectively. A distance between a projecting position of the first valley point 3132a on the central axis X and the projecting position of the peak point 3131a on the central axis X is larger than a distance between a projecting position of the second valley point 3132b on the central axis X and the projecting position of the peak point 3131a on the central axis X.

Moreover, the peak point 3131a of each of the annular convex structures 3131 is gradually away from the central axis X from the object-end portion 311 to the image-end portion 312.

As shown in FIG. 3A and FIG. 3C, when the distance between the projecting position of the first valley point 3132a on the central axis X and the projecting position of the peak point 3131a on the central axis X is DG1, the distance between the projecting position of the second valley point 3132b on the central axis X and the projecting position of the peak point 3131a on the central axis is DG2, a maximum distance between the projecting position of each of the valley points and the projecting position of the peak point 3131a on the axis vertical to the central axis X is HG (in the 3rd embodiment, that is a maximum distance between the projecting position of the second valley point 3132b and the projecting position of the peak point 3131a on the axis vertical to the central axis X), the maximum opening diameter of the annular convex structures 3131 is D, the minimum opening diameter of the annular convex structures 3131 is d, and the elastic drafting ratio of the annular convex structures 3131 is EDR(EDR=[(D−d)/D]×100%), the following conditions of the Table 3 are satisfied, respectively.

TABLE 3

| 3rd embodiment | | | |
|---|---|---|---|
| DG1 (mm) | 0.0915 | D(mm) | 7.71 |
| DG2 (mm) | 0.0085 | d(mm) | 7.6162 |
| DG1/DG2 | 10.765 | EDR (%) | 1.217 |
| HG (mm) | 0.0246 | | |

4th Embodiment

Figure 4A:
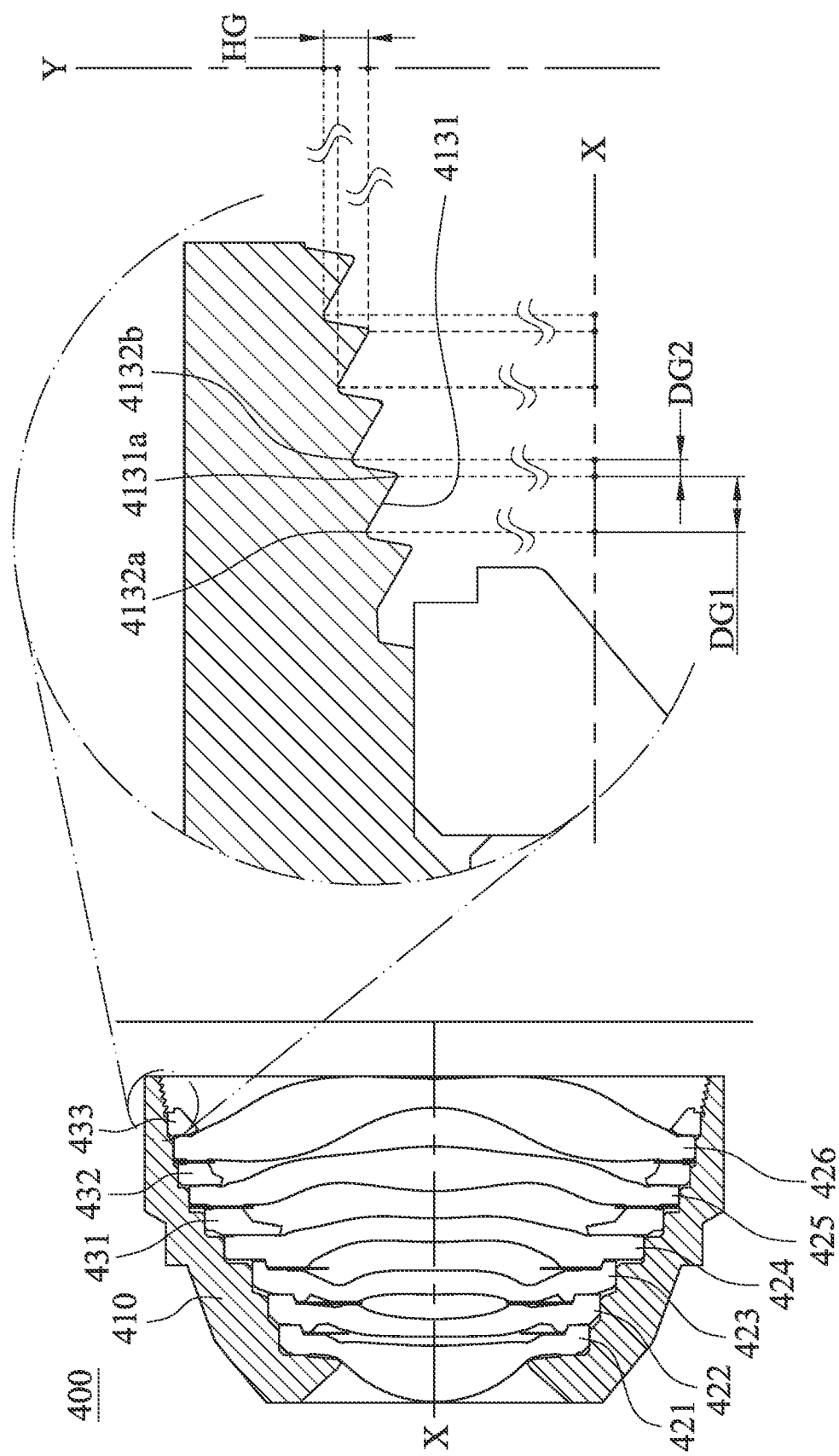
FIG. 4A is a schematic view of an imaging lens module according to the 4th embodiment of the present disclosure.
Figure 4B:
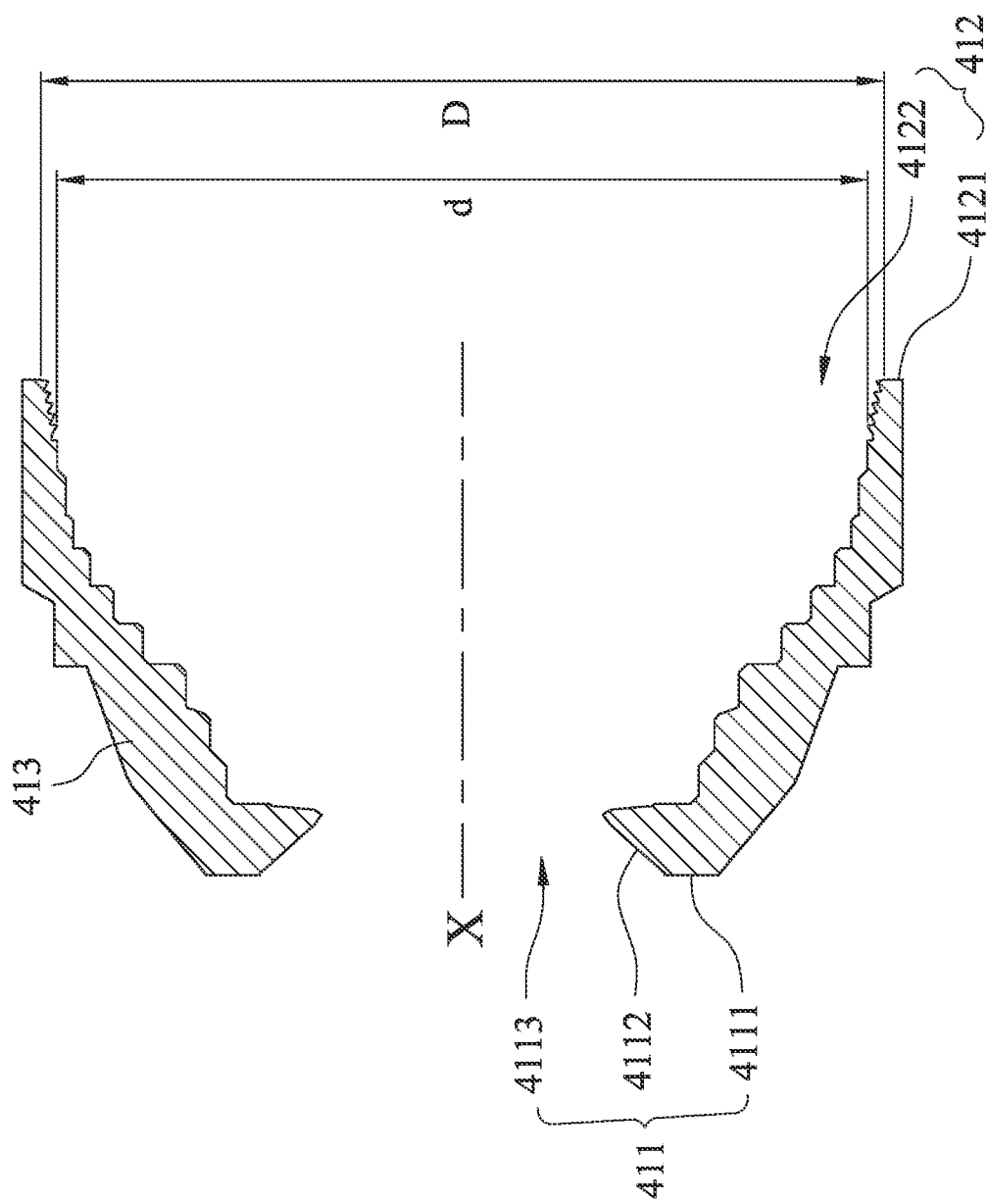
FIG. 4B is a planar cross-sectional view of the plastic lens barrel according to the 4th embodiment in FIG. 4A.

FIG. 4A is a schematic view of an imaging lens module 400 according to the 4th embodiment of the present disclosure. FIG. 4B is a planar cross-sectional view of the plastic lens barrel 410 according to the 4th embodiment in FIG. 4A. As shown in FIG. 4A, the imaging lens module 400 includes a plastic lens barrel 410 and optical lens assembly (its reference numeral is omitted), wherein the optical lens assembly is disposed in the plastic lens barrel 410.

In detail, in the 4th embodiment, the optical lens assembly includes, in order from the object side to the image side, six lens elements 421, 422, 423, 424, 425, 426, and the imaging lens module 400 further includes three retaining rings 431, 432, 433 for fixing the optical lens assembly in the plastic lens barrel 410. Moreover, the imaging lens module 400 can further include five light shielding sheets (its reference numeral is omitted), which can be respectively disposed between any two adjacent lens elements or retaining rings. In the 4th embodiment, the detailed arrangement of the retaining rings 431, 432, 433, and the light shielding sheet is as shown in FIG. 4A. The arrangement of the lens elements, the retaining rings and the light shielding sheets in the imaging lens module of the present disclosure is not limited to the 4th embodiment.

As shown in FIG. 4B, the plastic lens barrel 410 includes an object-end portion 411, an image-end portion 412, and a tube portion 413, wherein the tube portion 413 is connected to the object-end portion 411 and the image-end portion 412. The object-end portion 411 has an object-end outer surface 4111, an object-end opening 4113, and an object-end inner surface 4112, wherein one end of the object-end inner surface 4112 is connected to the object-end outer surface 4111 and surrounds the object-end opening 4113. The image-end portion 412 has an image-end outer surface 4121 and an image-end opening 4122. The tube portion 413 includes a plurality of the tube inner surfaces (its reference numeral is omitted), wherein one tube inner surface includes a plurality of the annular convex structures 4131, and each of the annular convex structures 4131 surrounds the central axis X of the plastic lens barrel 410. In the 4th embodiment, the annular convex structures 4131 and the plastic lens barrel 410 are integrally formed, and each of the annular convex structures 4131 has a smooth surface. The annular convex structures 4131 are not contacted with the optical lens assembly by the arrangement of the retaining ring 433.

In FIG. 4A and FIG. 4B, each of the annular convex structures 4131 includes a peak point 4131a and two valley points (that is, 4132a, 4132b) through a cross section of the central axis X. The peak point 4131a is the closest point to the central axis X on each of the annular convex structures 4131. The projecting positions of the two valley points on the central axis X are located on two sides of the projecting position of the peak point 4131a on the central axis X, wherein the projecting positions of the two valley points on the central axis X do not overlap with the projecting position of the peak point 4131a on the central axis X. In detail, each of the projecting positions of the peak points 4131a on the central axis X does not overlap with each of the projecting positions of the valley points on the central axis X, and the two valley points of each of the annular convex structures 4131 are farther from the central axis X than the peak point 4131a of each of the annular convex structures 4131 is thereto.

Moreover, please refer to FIG. 4A, the projecting positions of the two valley points on an axis vertical to the central axis X do not overlap with projecting position of the peak point 4131a on the axis vertical to the central axis X; that is, projecting positions of the two valley points on an virtual line Y do not overlap with projecting position of the peak point 4131a on the virtual line Y, and the virtual line Y is perpendicular to the central axis X.

A distance between the projecting position of one of the two valley points on the central axis X and the projecting position of the peak point 4131a on the central axis X is different from a distance between the projecting position of the other one of the two valley points on the central axis X and the projecting position of the peak point 4131a on the central axis X. In the 4th embodiment, the two valley points are a first valley point 4132a and a second valley point 4132b, respectively. A distance between a projecting position of the first valley point 4132a on the central axis X and the projecting position of the peak point 4131a on the central axis X is larger than a distance between a projecting position of the second valley point 4132b on the central axis X and the projecting position of the peak point 4131a on the central axis X.

Moreover, the peak point 4131a of each of the annular convex structures 4131 is gradually away from the central axis X from the object-end portion 411 to the image-end portion 412.

As shown in FIG. 4A and FIG. 4B, when the distance between the projecting position of the first valley point 4132a on the central axis X and the projecting position of the peak point 4131a on the central axis X is DG1, the distance between the projecting position of the second valley point 4132b on the central axis X and the projecting position of the peak point 4131a on the central axis is DG2, a maximum distance between the projecting position of each of the valley points and the projecting position of the peak point 4131a on the axis vertical to the central axis X is HG (in the 4th embodiment, that is a maximum distance between the projecting position of the second valley point 4132b and the projecting position of the peak point 4131a on the axis vertical to the central axis X), the maximum opening diameter of the annular convex structures 4131 is D, the minimum opening diameter of the annular convex structures 4131 is d, and the elastic drafting ratio of the annular convex structures 4131 is EDR(EDR=[(D−d)/D]×100%), the following conditions of the Table 4 are satisfied, respectively.

TABLE 4

| 4th embodiment | | | |
|---|---|---|---|
| DG1 (mm) | 0.0789 | D(mm) | 7.86 |
| DG2 (mm) | 0.0238 | d(mm) | 7.5569 |
| DG1/DG2 | 3.315 | EDR (%) | 3.856 |
| HG (mm) | 0.0635 | | |

5th Embodiment

Figure 5A:
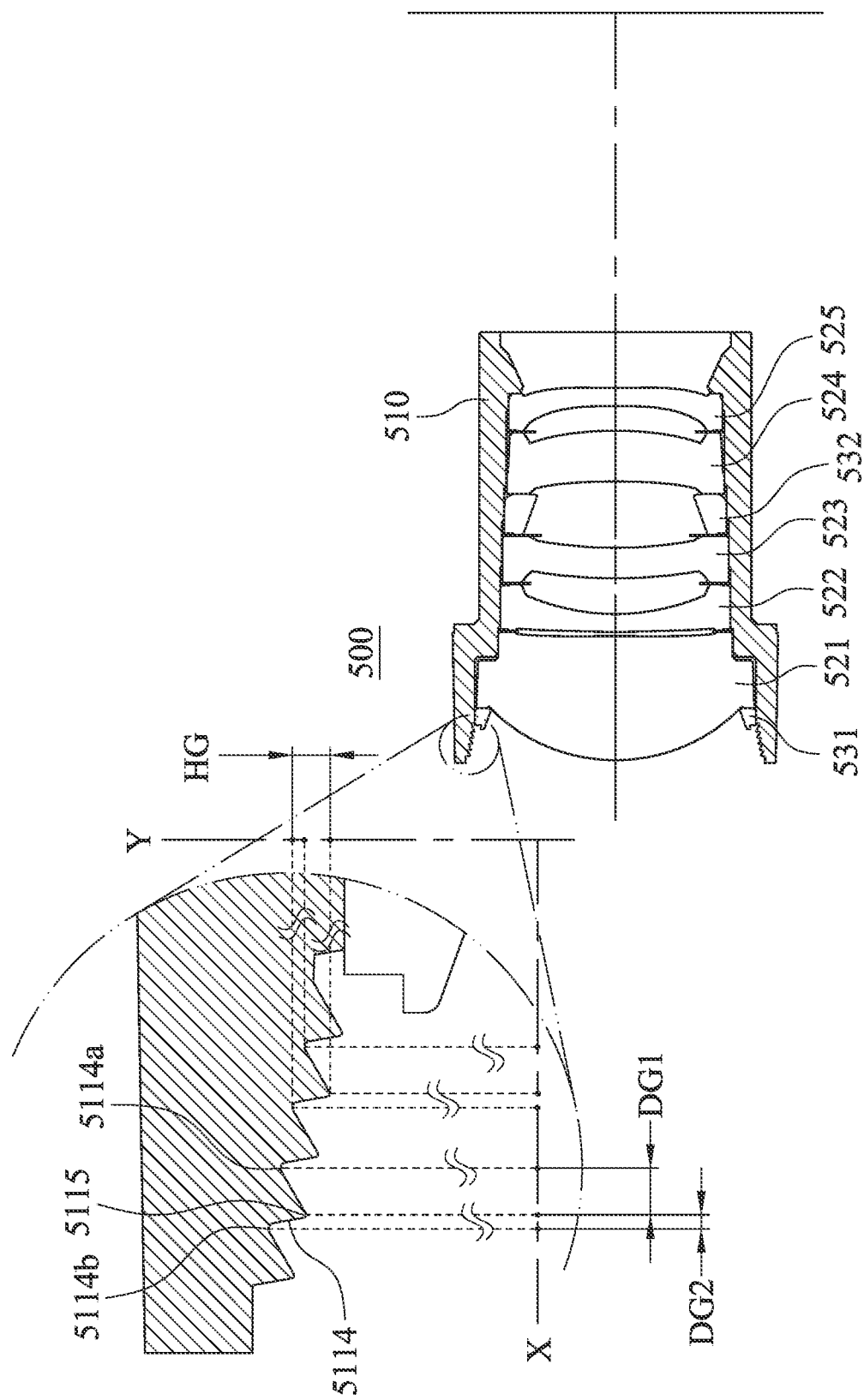
FIG. 5A is a schematic view of an imaging lens module according to the 5th embodiment of the present disclosure.
Figure 5B:
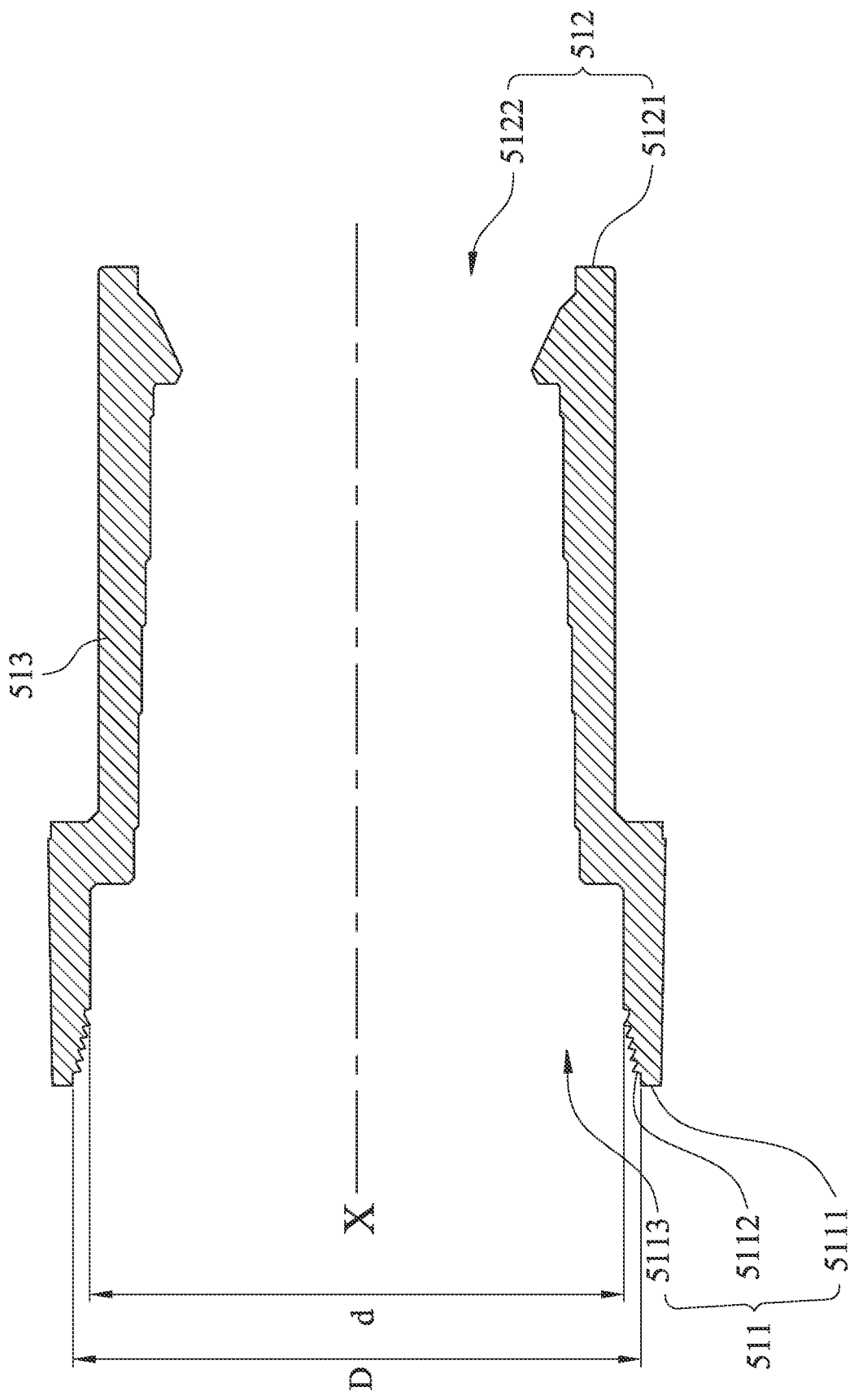
FIG. 5B is a planar cross-sectional view of a plastic lens barrel according to the 5th embodiment in FIG. 5A.

FIG. 5A is a schematic view of an imaging lens module according to the 5th embodiment of the present disclosure. FIG. 5B is a planar cross-sectional view of a plastic lens barrel 510 according to the 5th embodiment in FIG. 5A. As shown in FIG. 5A, the imaging lens module 500 includes a plastic lens barrel 510 and optical lens assembly (its reference numeral is omitted), wherein the optical lens assembly is disposed in the plastic lens barrel 510.

In detail, in the 5th embodiment, the optical lens assembly includes, in order from the object side to the image side, five lens elements 521, 522, 523, 524, 525, and the imaging lens module 500 further includes two retaining rings 531, 532 for fixing the optical lens assembly in the plastic lens barrel 510. Moreover, the imaging lens module 500 can further include four light shielding sheets (its reference numeral is omitted), which can be respectively disposed between any two adjacent lens elements or retaining rings. In the 5th embodiment, the detailed arrangement of the retaining rings 531, 532 and the light shielding sheet is as shown in FIG. 5A. The arrangement of the lens elements, the retaining rings and the light shielding sheets in the imaging lens module of the present disclosure is not limited to the 5th embodiment.

As shown in FIG. 5B, the plastic lens barrel 510 includes an object-end portion 511, an image-end portion 512, and a tube portion 513, wherein the tube portion 513 is connected to the object-end portion 511 and the image-end portion 512. The object-end portion 511 has an object-end outer surface 5111, an object-end opening 5113, and an object-end inner surface 5112, wherein one end of the object-end inner surface 5112 is connected to the object-end outer surface 5111 and surrounds the object-end opening 5113. The image-end portion 512 has an image-end outer surface 5121 and an image-end opening 5122. The tube portion 513 includes a plurality of the tube inner surfaces (its reference numeral is omitted). In the 5th embodiment, the object-end inner surface 5112 includes a plurality of annular convex structures 5114, and each of the annular convex structures 5114 surrounds the central axis X of the plastic lens barrel 510. The annular convex structures 5114 and the plastic lens barrel 510 are integrally formed, and each of the annular convex structures 5114 has a smooth surface. The annular convex structures 5114 are not contacted with the optical lens assembly by the arrangement of the retaining ring 531.

In FIG. 5A and FIG. 5B, each of the annular convex structures 5114 includes a peak point 5115 and two valley points (that is, 5114a, 5114b) through a cross section of the central axis X. The peak point 5115 is the closest point to the central axis X on each of the annular convex structures 5114. The projecting positions of the two valley points on the central axis X are located on two sides of the projecting position of the peak point 5115 on the central axis X, wherein the projecting positions of the two valley points on the central axis X do not overlap with the projecting position of the peak point 5115 on the central axis X. In detail, each of the projecting positions of the peak points 5115 on the central axis X does not overlap with each of the projecting positions of the valley points on the central axis X, and the two valley points of each of the annular convex structures 5114 are farther from the central axis X than the peak point 5115 of each of the annular convex structures 5114 is thereto.

Moreover, please refer to FIG. 5A, the projecting positions of the two valley points on an axis vertical to the central axis X do not overlap with projecting position of the peak point 5115 on the axis vertical to the central axis X; that is, projecting positions of the two valley points on an virtual line Y do not overlap with projecting position of the peak point 5115 on the virtual line Y, and the virtual line Y is perpendicular to the central axis X.

A distance between the projecting position of one of the two valley points on the central axis X and the projecting position of the peak point 5115 on the central axis X is different from a distance between the projecting position of the other one of the two valley points on the central axis X and the projecting position of the peak point 5115 on the central axis X. In the 5th embodiment, the two valley points are a first valley point 5114a and a second valley point 5114b, respectively. A distance between a projecting position of the first valley point 5114a on the central axis X and the projecting position of the peak point 5115 on the central axis X is larger than a distance between a projecting position of the second valley point 5114b on the central axis X and the projecting position of the peak point 5115 on the central axis X.

Moreover, the peak point 5115 of each of the annular convex structures 5114 is gradually away from the central axis X from the image-end portion 512 to the object-end portion 511.

As shown in FIG. 5A and FIG. 5B, when the distance between the projecting position of the first valley point 5114a on the central axis X and the projecting position of the peak point 5115 on the central axis X is DG1, the distance between the projecting position of the second valley point 5114b on the central axis X and the projecting position of the peak point 5115 on the central axis is DG2, a maximum distance between the projecting position of each of the valley points and the projecting position of the peak point 5115 on the axis vertical to the central axis X is HG (in the 5th embodiment, that is a maximum distance between the projecting position of the second valley point 5114b and the projecting position of the peak point 5115 on the axis vertical to the central axis X), the maximum opening diameter of the annular convex structures 5114 is D, the minimum opening diameter of the annular convex structures 5114 is d, and the elastic drafting ratio of the annular convex structures 5114 is EDR(EDR=[(D−d)/D]×100%), the following conditions of the Table 5 are satisfied, respectively.

TABLE 5

| 5th embodiment | | | |
|---|---|---|---|
| DG1 (mm) | 0.0789 | D(mm) | 5.06 |
| DG2 (mm) | 0.0238 | d(mm) | 4.757 |

TABLE 5-continued

5th embodiment

| DG1/DG2 | 3.315 | EDR (%) | 5.988 |
|---|---|---|---|
| HG (mm) | 0.0635 | | |

6th Embodiment

Figure 6A:
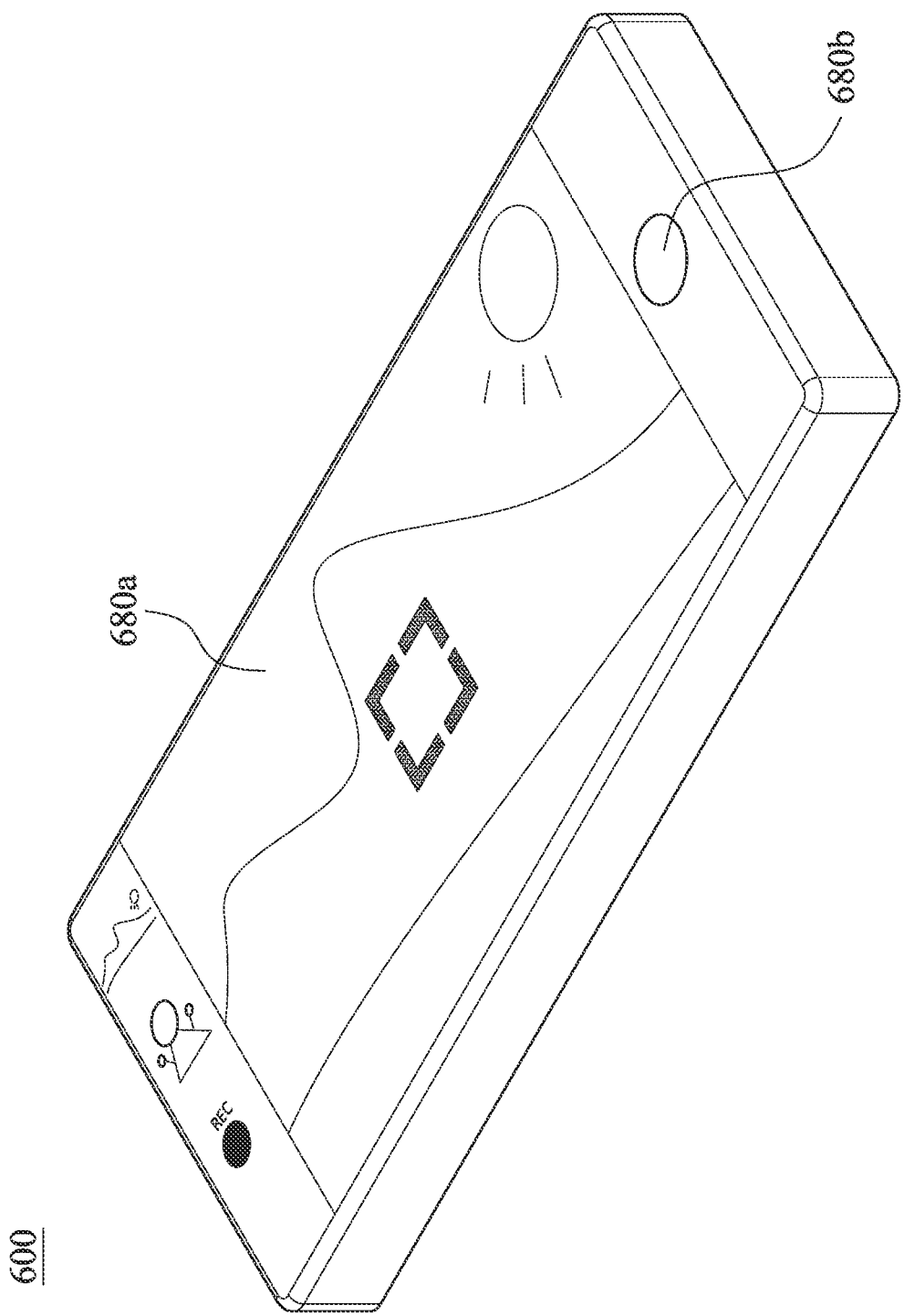
FIG. 6A is a schematic view of an appearance of an electronic device according to the 6th embodiment of the present disclosure.
Figure 6B:
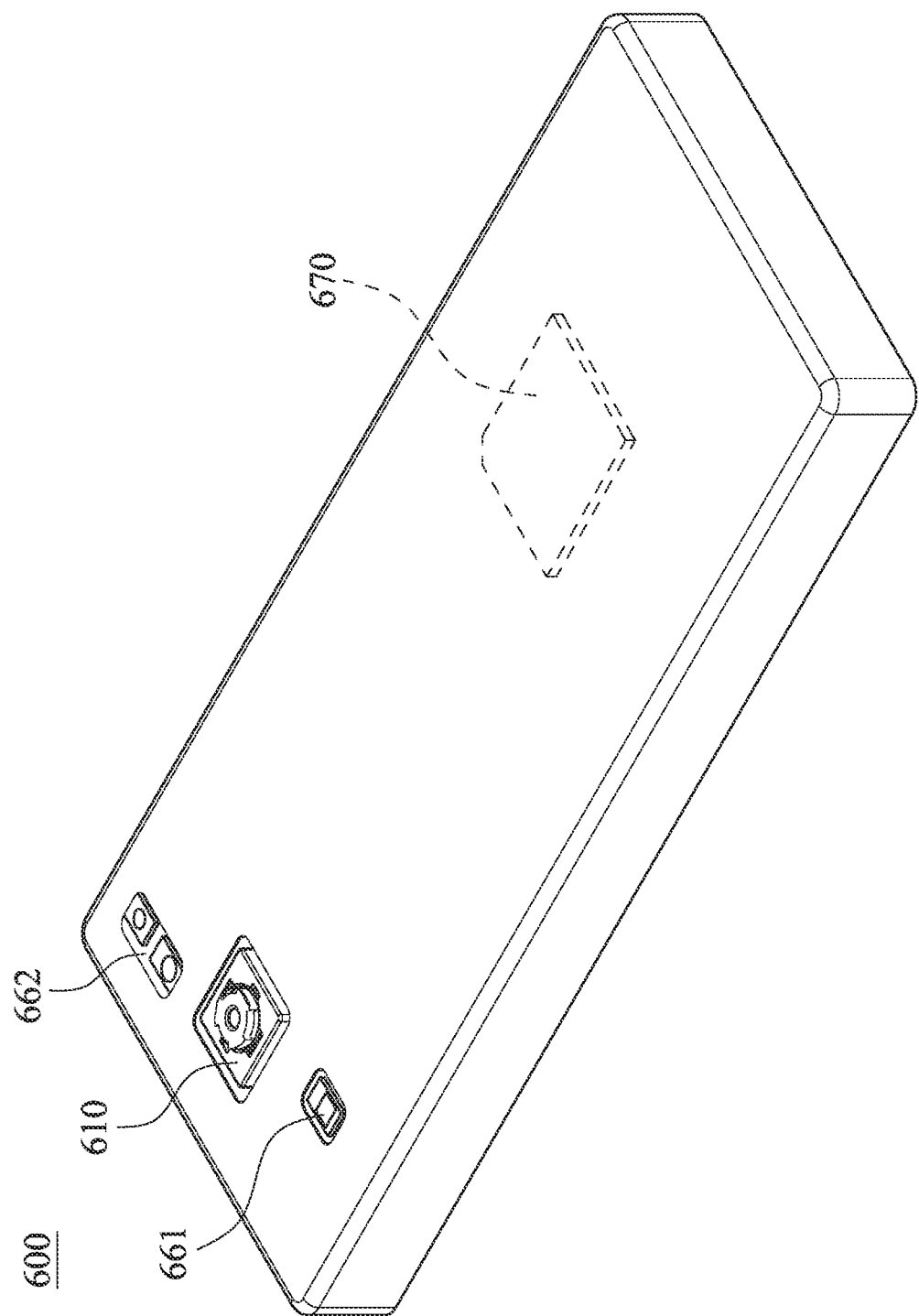
FIG. 6B is another schematic view of the appearance of the electronic device according to the 6th embodiment in FIG. 6A.
Figure 6C:
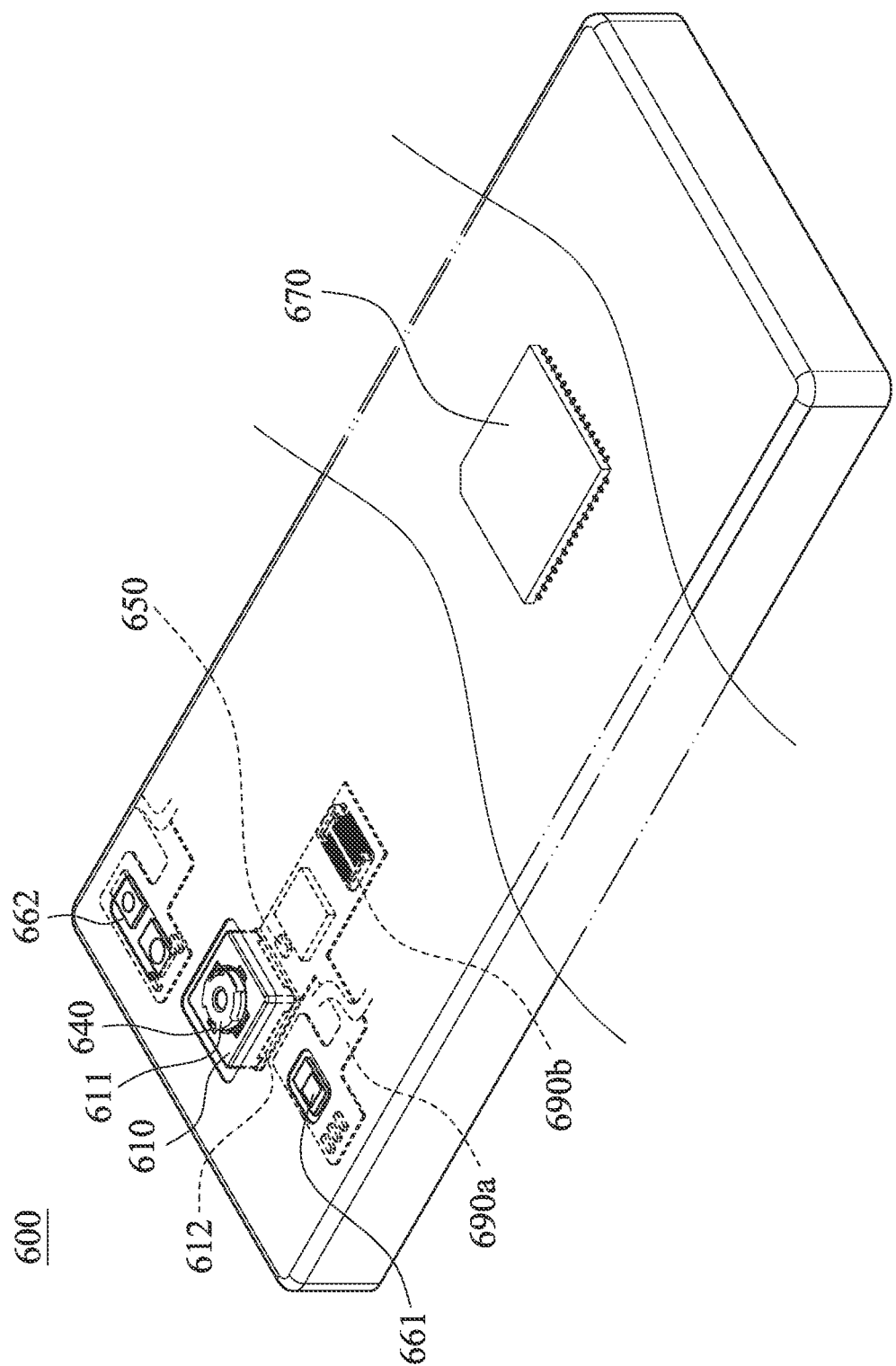
FIG. 6C is a schematic view of elements of the electronic device according to the 6th embodiment in FIG. 6A.
Figure 6D:
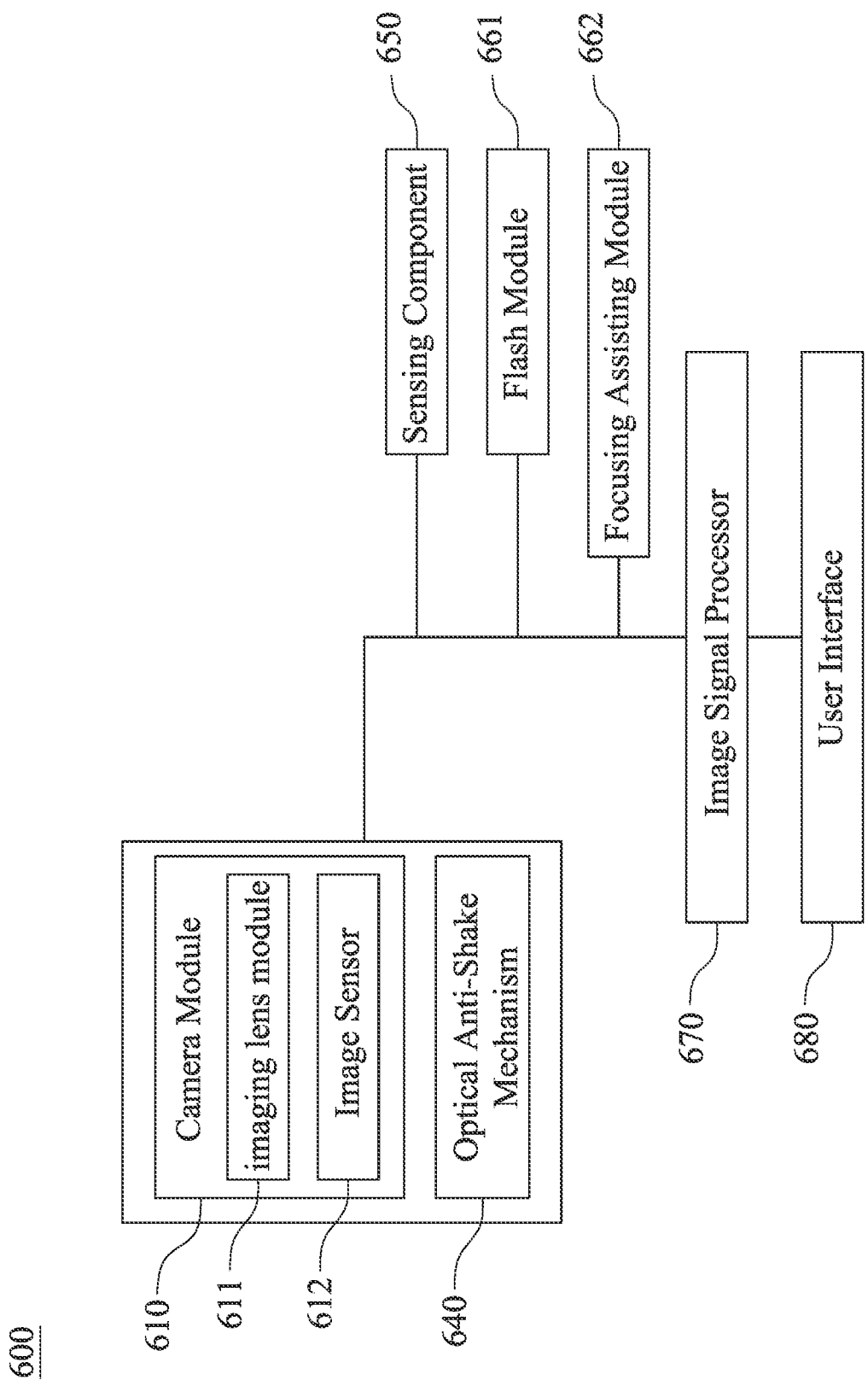
FIG. 6D is a block diagram of the electronic device according to the 6th embodiment in FIG. 6A.

FIG. 6A is a schematic view of an appearance of an electronic device according to the 6th embodiment of the present disclosure. FIG. 6B is another schematic view of the appearance of the electronic device according to the 6th embodiment in FIG. 6A. FIG. 6C is a component view of the electronic device 600 according to the 6th embodiment in FIG. 6A. FIG. 6D is a block diagram of the electronic device 600 according to the 6th embodiment in FIG. 6A. As shown in FIG. 6A, FIG. 6B, FIG. 6C, and FIG. 6D, the electronic device 600 is a smart phone according to the 6th embodiment. The electronic device 600 includes a camera module 610 according to the present disclosure, wherein the camera module 610 includes an imaging lens module 611 of any one of the aforementioned embodiments and an image sensor 612, the image sensor 612 is disposed on an image surface (not shown) of the imaging lens module 611. Therefore, it is favorable for satisfying requirements of the mass production and appearance of the imaging lens module applied to the electronic device nowadays.

Specifically, the user activates the capturing mode by the user interface 680 of the electronic device 600, wherein the user interface of the 6th embodiment can be a touch screen 680a, a button 680b, etc. At this moment, the imaging lens module 611 collects imaging light on the image sensor 612 and outputs electronic signals associated with images to an image signal processor (ISP) 670.

Corresponding to the camera specifications of the electronic device 600, the electronic device 600 can further include an optical anti-shake mechanism 640, which can be OIS anti-shake feedback device, moreover, the electronic device 600 can further include at least one auxiliary optical component (its reference numeral is omitted) and at least one sensing component 650. In the 6th embodiment, the auxiliary optical component can be a flash module 661 and a focusing assisting module 662, the flash module 661 can be for compensating color temperature, the focusing assisting module 662 can be an infrared distance measurement component, and a laser focus module, etc. The sensing component 650 can have functions for sensing physical momentum and kinetic energy, such as an accelerator, a gyroscope, a Hall Effect Element, to sense shaking or jitters applied by hands of the user or external environments. Further, it is favorable for obtaining good image quality with arrangement of the autofocus function and the optical anti-shake component 640 of the camera module 610 of the electronic device 600. Furthermore, the electronic device 600 can have a capturing function with multiple modes, such as taking optimized selfies, high dynamic range (HDR) under a low light condition, 4K resolution recording, etc. Additionally, the user can visually see the captured image of the camera through the touch screen and manually operate the view finding range on the touch screen to achieve the autofocus function of what you see is what you get.

Moreover, in FIG. 6C, the camera module 610, the optical anti-shake component 640, the sensing component 650, the flash module 661, and the focusing assisting module 662 can be disposed on a flexible printed circuitboard (FPC) 690a and electrically connected with the associated elements, such as an imaging signal processing element 670, via a connector 690b to perform a capturing process. Since the current electronic devices, such as smartphones, have a tendency of being light and thin, the way of firstly disposing the camera module, the imaging lens assembly and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In other embodiments (not shown), the sensing elements and the auxiliary optical elements can also be disposed on the main board of the electronic device or carrier boards in other forms according to requirements of the mechanical design and the circuit layout.

Furthermore, the electronic device 600 can further include, but not be limited to, a display, a control unit, a storage unit, a random access memory, a read-only memory, or the combination thereof.

7th Embodiment

Figure 7:
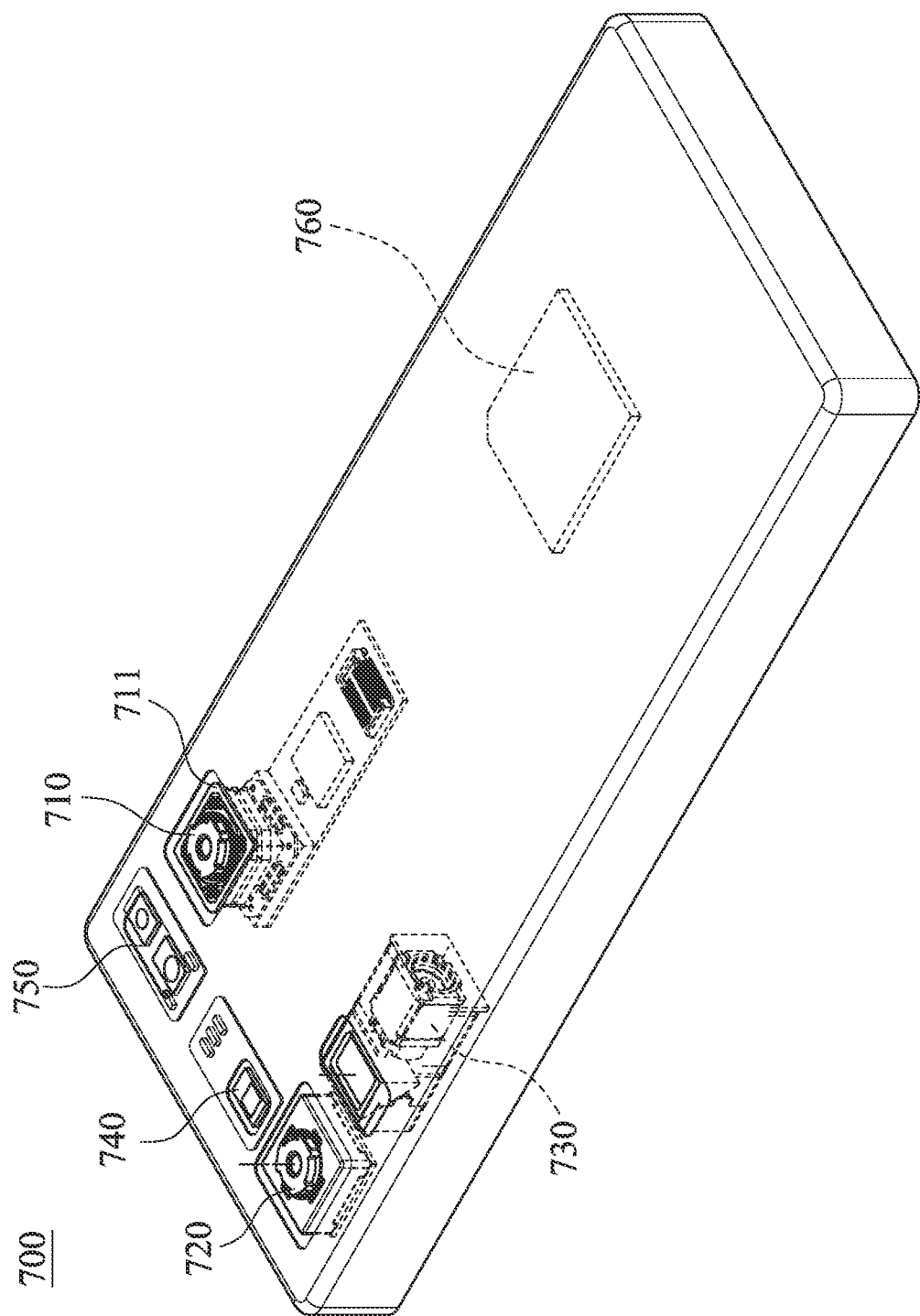
FIG. 7 is a schematic view of an electronic device according to the 7th embodiment of the present disclosure.

FIG. 7 is a schematic view of an electronic device 700 according to the 7th embodiment of the present disclosure. In FIG. 7, the electronic device 700 is a smart phone according to the 7th embodiment, and the electronic device 700 includes three camera modules 710, 720, and 730, the flash module 740, the auxiliary focusing component 750, the imaging signal processing element 760, the user interface (not shown), and image software processor (not shown), wherein the camera modules 710, 720 and 730 face towards the same side (that is, the object side). When the user captures the subject through the user interface, the electronic device 700 gathers the light and collects the image by using the camera modules 710, 720, and 730, activates the flash module 740 to fill light, conducts fast focusing by using the object distance information of the subject provided by the focusing assisting module 750, and processes the image optimization with the imaging signal processing element 760 and the image software processor, so as to further improve the image quality produced by the imaging lens module in the camera modules 710, 720, and 730. Moreover, the focusing assisting module 750 can use infrared or laser auxiliary focusing component to achieve fast focus. The user interface can be touch screen or physical capturing button, and the image processing software can be used for capturing image and processing image.

In the 7th embodiment, the camera modules 710, 720, and 730 can respectively include any of the imaging lens modules of the aforementioned 1st to 5th embodiments, and are not limited thereto.

In addition, in the 7th embodiment, an optical anti-shake mechanism 711 is disposed on the outer side of the camera module 710, which can be an OIS anti-shake feedback device. The image capturing device 730 is a telescope lens assembly, but the disclosure is not limited thereto.

8th Embodiment

Figure 8:
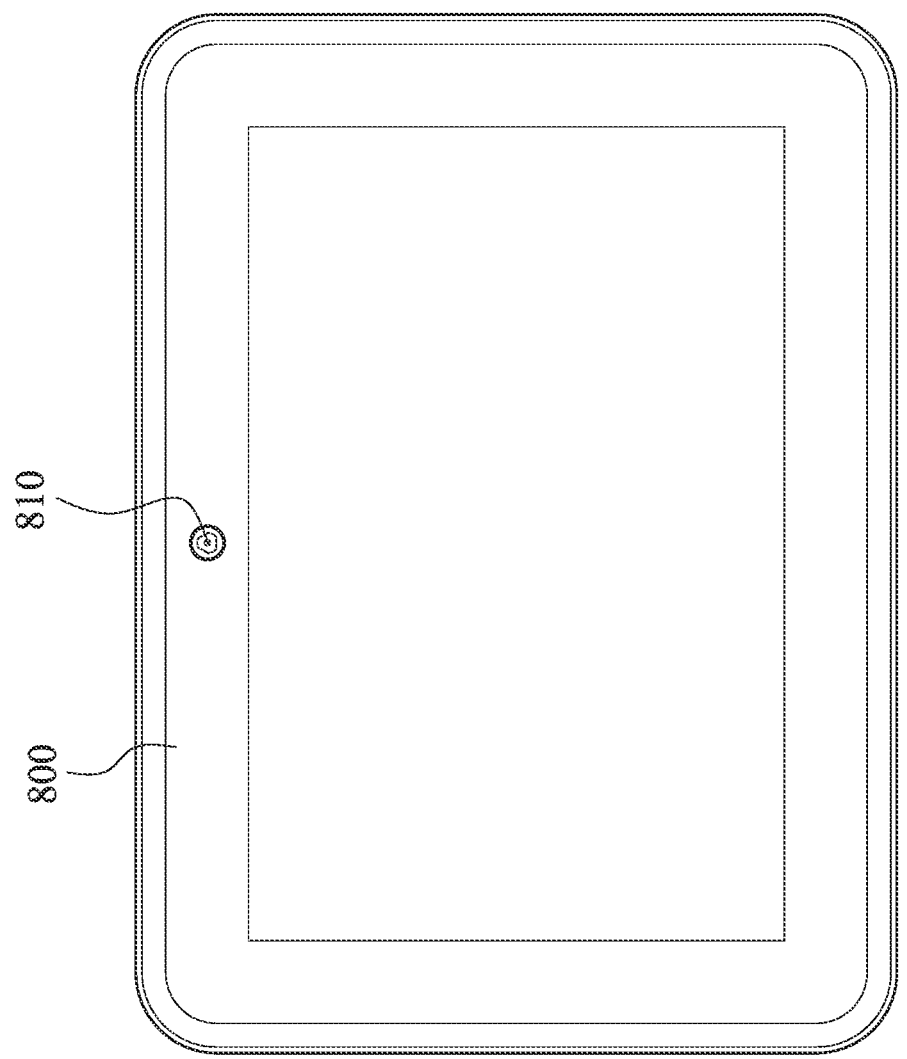
FIG. 8 is a schematic view of an electronic device according to the 8th embodiment of the present disclosure.

FIG. 8 is a schematic view of an electronic device 800 according to the 8th embodiment of the present disclosure. The electronic device 800 of the 8th embodiment is a tablet, and the electronic device 800 includes a camera module 810, wherein the camera module 810 includes an imaging lens module (not shown) and an image sensor according to the disclosure, and the image sensor is disposed on the image surface of the imaging lens module (not shown).

9th Embodiment

Figure 9:
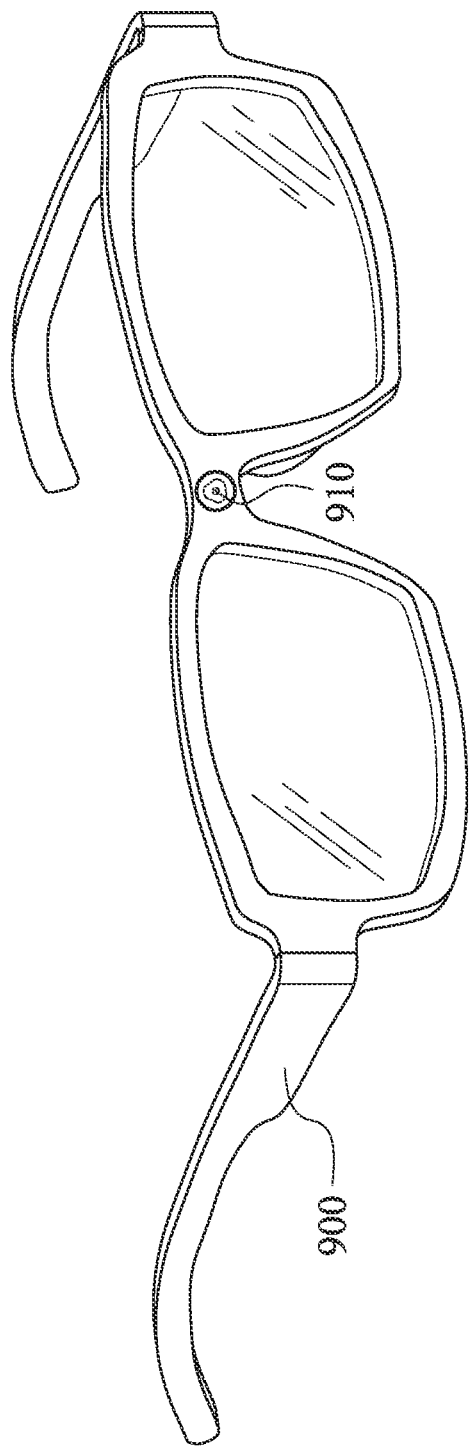
FIG. 9 is a schematic view of an electronic device according to the 9th embodiment of the present disclosure.
Figure 10:
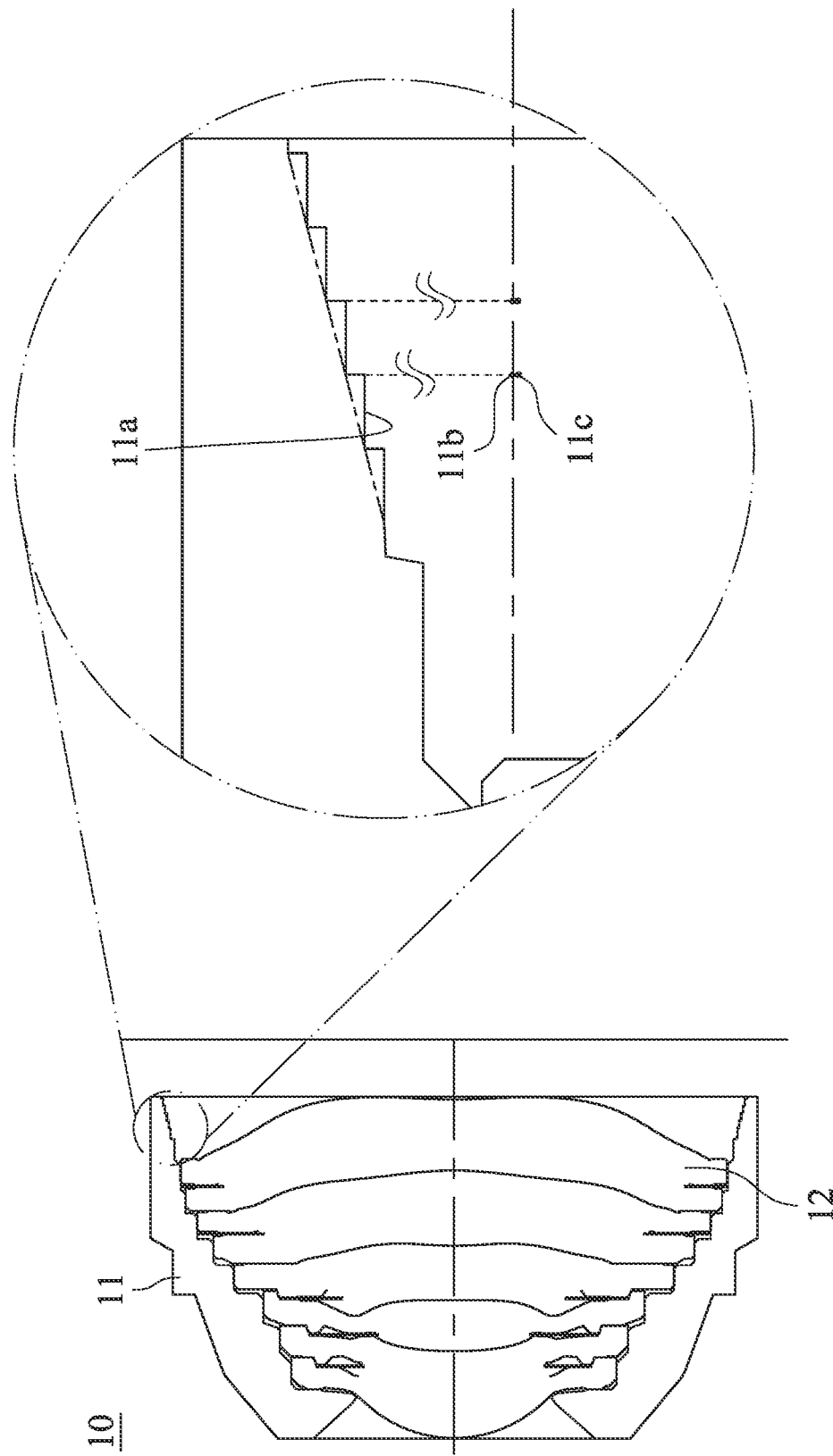
FIG. 10 is a schematic view of an imaging lens module applied to camera module in the conventional art.

FIG. 9 is a schematic view of an electronic device 900 according to the 9th embodiment of the present disclosure. The electronic device 900 of the 9th embodiment is a wearable device, and the electronic device 900 includes a camera module 910, wherein the camera module 910 includes an imaging lens module (not shown) and an image sensor (not shown) according to the disclosure, and the image sensor is disposed on the image surface of the imaging lens module (not shown).

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A plastic lens barrel, comprising:
an object-end portion having an object-end outer surface, an object-end opening, and an object-end inner surface, wherein one end of the object-end inner surface is connected to the object-end outer surface and surrounds the object-end opening;
an image-end portion having an image-end outer surface and an image-end opening; and
a tube portion connecting the object-end portion and the image-end portion, and comprising a plurality of tube inner surfaces, wherein at least one of the tube inner surfaces and the object-end inner surface comprises a plurality of annular convex structures, each of the annular convex structures surrounds a central axis of the plastic lens barrel, and a cross-sectional plane of each of the annular convex structures passing through the central axis comprises:
a peak point being a closest point to the central axis on each of the annular convex structures; and
two valley points, wherein projecting positions of the two valley points on the central axis are located on two sides of a projecting position of the peak point on the central axis, and the projecting positions of the two valley points on the central axis do not overlap with the projecting position of the peak point on the central axis;
wherein the two valley points are a first valley point and a second valley point, respectively, and a distance between a projecting position of the first valley point on the central axis and the projecting position of the peak point on the central axis is larger than a distance between a projecting position of the second valley point on the central axis and the projecting position of the peak point on the central axis;
wherein the distance between the projecting position of the first valley point on the central axis and the projecting position of the peak point on the central axis is $DG1$, the distance between the projecting position of the second valley point on the central axis and the projecting position of the peak point on the central axis is $DG2$, and the following condition is satisfied:

$$1.1 < DG1/DG2 < 25.0.$$

2. The plastic lens barrel of claim 1, wherein the annular convex structures and the plastic lens barrel are integrally formed.

3. The plastic lens barrel of claim 2, wherein each of the projecting positions of the peak points on the central axis does not overlap with each of the projecting positions of the valley points on the central axis.

4. The plastic lens barrel of claim 2, wherein the projecting positions of the two valley points on an axis vertical to the central axis do not overlap with the projecting position of the peak point on the axis vertical to the central axis.

5. The plastic lens barrel of claim 2, wherein a distance between the projecting position of one of the two valley points on the central axis and the projecting position of the peak point on the central axis is different from a distance between the projecting position of the other one of the two valley points on the central axis and the projecting position of the peak point on the central axis.

6. The plastic lens barrel of claim 2, wherein the distance between the projecting position of the first valley point on the central axis and the projecting position of the peak point on the central axis is $DG1$, the distance between the projecting position of the second valley point on the central axis and the projecting position of the peak point on the central axis is $DG2$, and the following condition is satisfied:

$$1.8 < DG1/DG2 < 17.0.$$

7. The plastic lens barrel of claim 2, wherein each of the annular convex structures has a smooth surface.

8. The plastic lens barrel of claim 2, wherein a maximum opening diameter of the annular convex structures is $D$, a minimum opening diameter of the annular convex structures is $d$, an elastic drafting ratio of the annular convex structures is $EDR$, and the following condition is satisfied:

$$0\% < EDR < 8\%, \text{ wherein } EDR = [(D-d)/D] \times 100\%.$$

9. The plastic lens barrel of claim 2, wherein the two valley points of each of the annular convex structures are farther from the central axis than the peak point of each of the annular convex structures is thereto.

10. The plastic lens barrel of claim 2, wherein the peak point of each of the annular convex structures is gradually away from the central axis from the object-end portion to the image-end portion or from the image-end portion to the object-end portion.

11. The plastic lens barrel of claim 4, wherein in each of the annular convex structures, a maximum distance between the projecting position of each of the valley points and the projecting position of the peak point on the axis vertical to the central axis is $HG$, and the following condition is satisfied:

$$0.002 \text{ mm} < HG < 0.15 \text{ mm}.$$

12. An imaging lens module, comprising:
the plastic lens barrel of claim 1; and
an optical lens assembly disposed in the plastic lens barrel.

13. The imaging lens module of claim 12, further comprising:

a retaining ring for fixing the optical lens assembly in the plastic lens barrel.

14. The imaging lens module of claim 13, further comprising:
a glue disposed between at least one of the annular convex structures and the retaining ring.

15. The imaging lens module of claim 12, wherein the annular convex structures are not contacted with the optical lens assembly.

16. An electronic device, comprising:
the imaging lens module of claim 12.

* * * * *